US008800745B2

(12) United States Patent
Spangler

(10) Patent No.: US 8,800,745 B2
(45) Date of Patent: Aug. 12, 2014

(54) MODULAR MANUFACTURING LINE INCLUDING WORK TOOL HAVING WORK TOOL SPRAY NOZZLE AND METHOD OF OPERATION THEREFOR

(71) Applicant: Caterpillar Inc., Peoria, IL (US)

(72) Inventor: John M. Spangler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 113 days.

(21) Appl. No.: 13/630,358

(22) Filed: Sep. 28, 2012

(65) Prior Publication Data

US 2013/0026002 A1 Jan. 31, 2013

Related U.S. Application Data

(63) Continuation-in-part of application No. 12/319,670, filed on Jan. 9, 2009, now abandoned, and a continuation-in-part of application No. 12/151,936, filed on May 9, 2008, now Pat. No. 8,360,225.

(51) Int. Cl.
*B65G 15/64* (2006.01)
*B65G 35/06* (2006.01)
*B05B 13/04* (2006.01)
*B05B 13/02* (2006.01)

(52) U.S. Cl.
CPC .......... *B65G 35/063* (2013.01); *B05B 13/0452* (2013.01); *B05B 13/0264* (2013.01)
USPC .................. 198/345.3; 198/465.4; 118/323; 118/324

(58) Field of Classification Search
USPC .................. 198/345.3, 465.1; 118/323, 324
See application file for complete search history.

(56) References Cited

U.S. PATENT DOCUMENTS

| 2,777,419 | A | * | 1/1957 | Paasche | 118/323 |
|---|---|---|---|---|---|
| 4,357,900 | A | * | 11/1982 | Buschor | 118/681 |
| 4,785,760 | A | * | 11/1988 | Tholome | 118/323 |
| 4,850,382 | A | | 7/1989 | Williams | |
| 5,905,651 | A | * | 5/1999 | Coulibaly et al. | 700/123 |
| 7,421,953 | B2 | * | 9/2008 | Johansson et al. | 104/166 |
| 7,517,547 | B2 | | 4/2009 | Chappa et al. | |
| 7,556,139 | B2 | * | 7/2009 | Tsuruya et al. | 198/465.4 |
| 7,677,196 | B2 | | 3/2010 | Herre | |
| 7,691,450 | B2 | * | 4/2010 | Kenmoku et al. | 427/421.1 |
| 7,900,767 | B2 | | 2/2011 | Spangler et al. | |
| 7,815,036 | B2 | | 3/2011 | Spangler et al. | |
| 8,086,341 | B2 | | 12/2011 | Spangler et al. | |

(Continued)

FOREIGN PATENT DOCUMENTS

JP 62110764 5/1987

*Primary Examiner* — William R Harp
(74) *Attorney, Agent, or Firm* — Liell & McNeil

(57) ABSTRACT

A modular manufacturing line includes first and second modular manufacturing stations. Each station includes a framework defining a manufacturing space, and an overhead friction drive system supported on the framework for moving a suspended article through the manufacturing space. A control system is in communication with each drive system and is configured to simultaneously control a first article at the first station according to one operation pattern and control a second article at the second station according to a different operation pattern. A work tool including a work tool spray nozzle is positioned at the first station and is movable along a floor mounted work tool support track. The first article moves through an article pathway volume that intersects with a work tool pathway volume defined by the work tool movement.

20 Claims, 18 Drawing Sheets

(56) References Cited

U.S. PATENT DOCUMENTS

| | | |
|---|---|---|
| 8,127,687 B2 | 3/2012 | Spangler et al. |
| 8,191,481 B2 * | 6/2012 | Spangler et al. ............... 104/89 |
| 8,196,731 B2 * | 6/2012 | Spangler et al. ........... 198/345.3 |
| 8,235,000 B2 * | 8/2012 | Spangler et al. .............. 118/686 |
| 2005/0066890 A1 | 3/2005 | Wetzel |
| 2008/0184932 A1 | 8/2008 | Albrecht et al. |
| 2009/0248190 A1 | 10/2009 | Spangler |
| 2009/0277384 A1 | 11/2009 | Spangler et al. |
| 2009/0277745 A1 | 11/2009 | Spangler et al. |
| 2009/0277746 A1 | 11/2009 | Spangler et al. |
| 2009/0277748 A1 | 11/2009 | Spangler et al. |
| 2009/0277755 A1 | 11/2009 | Spangler et al. |
| 2009/0279992 A1 | 11/2009 | Spangler et al. |
| 2010/0008749 A1 | 1/2010 | Spangler et al. |

\* cited by examiner

MODULAR MANUFACTURING LINE INCLUDING WORK TOOL HAVING WORK TOOL SPRAY NOZZLE AND METHOD OF OPERATION THEREFOR

CROSS-REFERENCE TO RELATED APPLICATIONS

This patent application is a continuation-in-part of U.S. patent application Ser. No. 12/319,670, filed Jan. 9, 2009, which is a continuation-in-part of U.S. patent application Ser. No. 12/151,936, filed May 9, 2008.

TECHNICAL FIELD

The present disclosure relates generally to a modular manufacturing line, and more particularly to a manufacturing line including a work tool having a work tool spray nozzle.

BACKGROUND

During a manufacturing process, a product is typically advanced through a plurality of manufacturing stations of a manufacturing chain. Specifically, the product is transported through each of the manufacturing stations along an article transportation device. At each manufacturing station, a specific one of a plurality of tasks in the manufacturing process is performed. All equipment and other components necessary to perform the assigned task are positioned, and often permanently affixed, at each manufacturing station. As a result, and dependent upon the number of tasks and the complexity of the manufacturing process, a manufacturing chain is typically a large structure that is permanently situated inside a manufacturing facility.

At least partially as a result of its permanency, a manufacturing chain is typically inflexible, such that modifying, removing, or replacing the manufacturing chain may be an expensive and time-consuming process. Therefore, even minor improvements to the manufacturing process, such as, for example, changes to the equipment positioned at one manufacturing station, may be too expensive and time consuming to implement. Further, if the manufacturing process performed by the manufacturing chain becomes unnecessary, it may not be feasible to alter the manufacturing chain to perform a different manufacturing process. Ultimately, the manufacturing chain may only be cost effective in performing the specific manufacturing process for which it was designed. As a result, the significant amount of costs and efforts to design and construct the manufacturing chain may be wasted.

Another drawback with conventional manufacturing chains involves the article transportation system along which the products are transported. Since the products are typically carried along one article transportation device having a single driving source, such as a common monorail conveyor, the entire manufacturing chain must be stopped in order to correct a problem occurring at any point along the manufacturing chain. Power and free conveyors offer one solution by allowing carriers to be routed off of the main line, such as if a defect is identified, but still provide continuous movement of the main line. In either case, stopping the main line can result in significant down time and, therefore, reduced efficiency and, ultimately, throughput of the manufacturing chain. This may further increase process time for manufacturing processes that already require a significant amount of time. For example, it is known that a drying or curing stage of a paint process may require a significant amount of time, thus greatly increasing the minimal process time for the manufacturing process.

U.S. Pat. No. 6,120,604 teaches a powder coating chain having a plurality of conveyors for transporting parts through a plurality of processing areas. Specifically, each processing area includes a separate motor driven conveyor, sensors for providing information on conditions within the processing area, and a control circuit coupled to both the sensors and an operator interface. A user may manipulate the operator interface to monitor sensed conditions within each processing area. Although the reference suggests an aspect of modularity that may offer certain limited benefits, it does not contemplate improvements to the overall process flow within the manufacturing chain. In fact, the reference does not disclose modifications to the exemplary high-speed blank powder coating process, but rather seeks to quickly identify a source of a mechanical problem associated with the process. As should be appreciated, there is a continuing need for manufacturing chains providing improved quality and efficiency with respect to a manufacturing process. In addition, there is a continuing need for manufacturing chains, or manufacturing stations thereof, that may be more easily modified, removed, or replaced.

The present disclosure is directed to one or more of the problems set forth above.

SUMMARY OF THE DISCLOSURE

In one aspect, a modular manufacturing line includes a first modular manufacturing station including a first framework defining a first manufacturing space. A first overhead friction drive system is supported on the first framework and configured to move a first suspended article through the first manufacturing space. The modular manufacturing line further includes a second modular manufacturing station including a second framework defining a second manufacturing space, and a second overhead friction drive system supported on the second framework for moving a second suspended article through the second manufacturing space. The first and second overhead friction drive systems are operationally aligned to define a transportation path through the modular manufacturing line. A control system is in control communication with the first and second overhead friction drive systems and configured to simultaneously control the first suspended article according to a first operation pattern and control the second suspended article according to a second operation pattern that is different than the first operation pattern. The modular manufacturing line also includes a work tool including a work tool spray nozzle operationally positioned at the first modular manufacturing station and movable along a floor mounted work tool support track. The first suspended article occupies an article pathway volume, which corresponds to an article footprint and a length of the first modular manufacturing station, during movement through the first manufacturing space. The work tool occupies a work tool pathway volume during movement through the first manufacturing space. The work tool pathway volume corresponds to a work tool footprint and a width of the first modular manufacturing station, and intersects with the article pathway volume.

According to another aspect, a method of operating a modular manufacturing line is provided. The modular manufacturing line includes first and second modular manufacturing stations. Each of the modular manufacturing stations includes a framework defining a respective one of first and second manufacturing spaces, and an overhead friction drive system supported on the framework. The modular manufacturing line also includes a control system in control communication with the overhead friction drive systems, and a work tool including a work tool spray nozzle operationally positioned at the first modular manufacturing station. The method includes steps of supporting a first suspended article from a first overhead friction drive system, and supporting a second suspended article from a second overhead friction drive system. First control signals are transmitted from the control system to the first overhead friction drive system, while second control signals are transmitted from the control system to the second overhead friction drive system. The first suspended article is moved within the first manufacturing space according to a first operation pattern responsive to the first control signals, while, simultaneously, the second suspended article is moved within the second manufacturing space according to a second operation pattern that is different than the first operation pattern responsive to the second control signals. The method also includes a step of occupying an article pathway volume, which corresponds to an article footprint and a length of the first modular manufacturing station, with the first suspended article during the step of moving the first suspended article. During another step of the method, the work tool is moved along a floor mounted work tool support track and through the article pathway volume.

DETAILED DESCRIPTION

Figure 1:
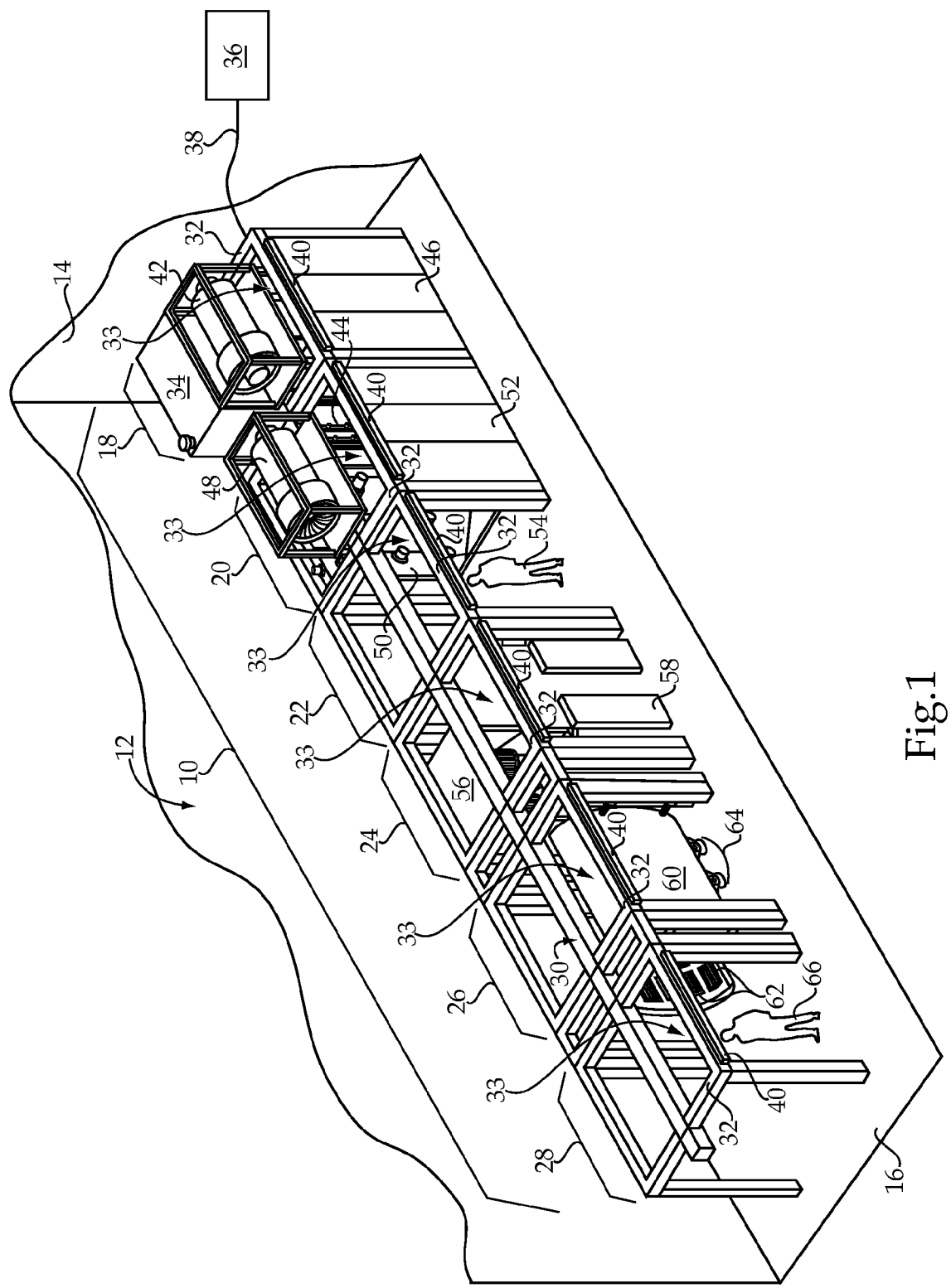
FIG. 1 is a diagrammatic perspective view of a manufacturing chain, according to the present disclosure.

An exemplary embodiment of a manufacturing chain 10 is shown generally in FIG. 1. The manufacturing chain 10 may be disposed within a manufacturing area 12, such as, for example, a manufacturing area defined by a building 14. According to one embodiment, the manufacturing chain 10 may be secured to, and positioned above, a planar floor 16 of the manufacturing area 12. However, numerous locations and arrangements are contemplated for the manufacturing chain 10. According to the exemplary embodiment, the manufacturing chain 10 may be used to perform a paint process, such as, for example, a powder coating process, and, therefore, may also be referred to as a paint line. Although a paint process is described, however, it should be appreciated that the manufacturing chain 10 may be designed to perform any of a variety of manufacturing processes.

The manufacturing chain 10, also referred to as a modular manufacturing chain or a modular manufacturing line, may include several modular manufacturing stations, such that each modular manufacturing station is configured to perform at least one task in the manufacturing process. Specifically, and according to one example, the manufacturing chain 10 may include a wash station 18, a blow off station 20, an inspection station 22, a paint application station 24, a curing station 26, and an unload station 28. Although six modular manufacturing stations 18, 20, 22, 24, 26, and 28 are shown, it should be appreciated that the manufacturing chain 10 may include any number of modular manufacturing stations necessary to perform the designated manufacturing process. It should also be appreciated that the paint process, as described herein, has been simplified for ease of explanation, and is in no way meant to be limited to the specific tasks described.

The modular manufacturing stations 18, 20, 22, 24, 26, and 28 may be positioned in series, as shown, or the manufacturing chain 10 may include one or more of the modular manufacturing stations 18, 20, 22, 24, 26, and 28 positioned in parallel, as dictated by the specific tasks of the manufacturing process. Further, the modular manufacturing stations 18, 20, 22, 24, 26, and 28 may include equipment, and other components, necessary to accomplish the task to be performed at the respective one of the modular manufacturing stations 18, 20, 22, 24, 26, and 28. It should be appreciated that multiple tasks may be performed at one modular manufacturing station or, alternatively, a more complex task may be performed over a plurality of modular manufacturing stations. Ultimately, one or more tasks may be performed on an article, or product, as it is transported through the modular manufacturing stations 18, 20, 22, 24, 26, and 28 along an article transportation system 30, described later in greater detail.

The equipment and other components necessary to perform a task at a respective one of each of the modular manufacturing stations 18, 20, 22, 24, 26, and 28 may be supported by a framework or, more specifically, a manufacturing module 32 defining a manufacturing space 33. For example, the manufacturing chain 10 may include a plurality of manufacturing modules 32 positioned and configured to accommodate the modular manufacturing stations 18, 20, 22, 24, 26, and 28. As shown in the embodiment of FIG. 1, the manufacturing modules 32 may be positioned in series, as dictated by the modular manufacturing stations 18, 20, 22, 24, 26, and 28. However, the size and geometry of the manufacturing chain 10, comprising the manufacturing modules 32, may include any of a variety of possible sizes and configurations, such as, for example, an "L" shaped configuration or a "U" shaped configuration. Further, although FIG. 1 illustrates exactly one of the modular manufacturing stations 18, 20, 22, 24, 26, and 28 associated with each manufacturing module 32, it should be appreciated that each manufacturing module 32 may support more than one of the modular manufacturing stations 18, 20, 22, 24, 26, and 28.

According to the exemplary embodiment, the wash station 18 may be configured to perform a wash and/or rinse task of the paint process. Specifically, the wash station 18 may include a water tank 34, supported by the manufacturing module 32, for supplying water, or a solvent mixture, to the wash station 18. Alternatively, however, water may be supplied directly to the wash station 18 from a utility infrastructure of the building 14 or, alternatively, from an external utility connection 36 disposed outside the manufacturing area 12 and connected to the manufacturing chain 10 via a conduit 38. The external utility connection 36 may, therefore, include a source of water or, alternatively, may include a source of another utility, such as, for example, electric power or data.

According to the current embodiment, the conduit 38 may provide water to a utility transfer module 40 supported by the manufacturing module 32. The utility transfer module 40 may be configured to transfer a utility, such as, for example, electric power, fluid, or data, through the manufacturing module 32. The utility may be used at the wash station 18 and, further, may be transferred to a contiguous manufacturing module 32. For example, each of the other manufacturing modules 32 may include utility transfer modules 40, such that a utility may be supplied at one manufacturing module 32 and used at another. Specifically, each manufacturing module 32 may receive a utility from a preceding manufacturing module 32 of the manufacturing chain 10, and may transfer the utility to a succeeding manufacturing module 32.

The wash station 18 may further include a water pump 42 for circulating the water or solvent mixture through the wash station 18 and/or pressurizing the water or solvent mixture. According to one embodiment, the water or solvent mixture may be directed through a plurality of water nozzles 44, such that the water nozzles 44 are configured to spray an article as it passes through the wash station 18 to remove any foreign substances deposited on the article. Such foreign substances may include, for example, grease, dirt, dust, oils, or any other substances that may interfere with the paint application process. The wash station 18 may also include a plurality of water barrier panels 46 for preventing the water or the solvent mixture from escaping the wash station 18, and a drain system for returning the used water or the solvent mixture to the water tank 34. It should be appreciated that the wash station 18 may include any equipment useful in removing foreign substances from an article before paint, such as, for example, powdered paint, is applied.

The blow off station 20 may be configured to remove any water or solvent mixture remaining on the article after the article passes through the wash station 18. Specifically, the blow off station 20 may include a fan 48, or pump, for pressurizing air and a plurality of air nozzles 50 for directing the pressurized air toward the article. Either or both of the fan 48 and air nozzles 50 may be supported by the manufacturing module 32. Further, the blow off station 20 may include a hose (not shown) available to an operator for manually directing pressurized air toward the article. According to one embodiment, pressurized air may be provided via the utility transfer module 40. Specifically, pressurized air may be supplied to the utility transfer module 40 directly from a source, or indirectly via the utility transfer module 40 of a contiguous manufacturing module 32.

Air barrier panels 52, or walls, may also be provided at the blow off station 20 for preventing pressurized air blown from the air nozzles 50 from interfering with activities or equipment outside of the blow off station 20. After the water or solvent mixture is sufficiently removed from the article at the blow off station 20, the article may be transported to the inspection station 22, which may provide a location for an operator 54 to inspect the article. The inspection may, for example, involve visual, physical, or chemical analyses to determine the presence of any remaining impurities on the surface of the article.

After inspection, the article may be transported along the article transportation system 30 to the paint application station 24. The paint application station 24 may include a piece of paint application equipment 56 for coating the article with paint, such as, according to one example, a powdered paint. The paint application station 24 may further include a plurality of paint barrier panels 58 for restricting the paint to the confines of the paint application station 24. Either or both of the paint application equipment 56 and the paint barrier panels 58 may be supported by the manufacturing module 32. Alternatively, however, the paint application equipment 56 and the paint barrier panels 58 may be secured to the planar floor 16. As should be appreciated, the equipment used at the paint application station 24 may vary, depending on the type of paint used and the application process that is implemented. For example, the paint may be sprayed onto the article or, alternatively, the article may be immersed in a tank containing paint.

From the paint application station 24, the article may be transported to the curing station 26. The curing station 26 may be configured to heat or otherwise cure the coating of freshly applied paint. According to one embodiment, the curing station 26 may include a plurality of infrared heaters 60, which may contain a plurality of infrared heater lamps 62 for generating the heat necessary for causing the coating of paint on the article to cure. According to one embodiment, the infrared heaters 60 may be portable. For example, one or more sets of rollers 64 may be provided to facilitate movement of the infrared heaters 60 from one location, such as a storage location, and into the illustrated position relative to the paint application station 24. It should be appreciated that "portable" equipment, as used herein, may refer to any equipment or component that may not be characterized as a fixture or otherwise permanently attached component. It should also be appreciated that any equipment useful in making the coating of paint applied to the article permanent is contemplated for use at the curing station 26.

For simplicity, the exemplary paint process is described as having one paint application station 24; however, it should be appreciated that a paint process may often include coating the article with multiple coatings of paint. As a result, the manufacturing chain 10 may include additional paint applications stations 24 and, if necessary, manufacturing modules 32 to accommodate such a process. Ultimately, after the desired number of paint coatings are applied to the article, the article may be transported to the unload station 28. At the unload station 28, the article may be removed from the manufacturing chain 10 or, more specifically, the article transportation system 30 by an operator 66. After passing through the manufacturing chain 10, it is contemplated that the article may be transported to another manufacturing chain for further processing, if desired. According to one embodiment, the article may be routed to a buffer area before passing to another manufacturing chain. Alternatively, the article may be taken to a storage location for storage, or to a transportation vehicle for delivery to a customer.

Figure 2:
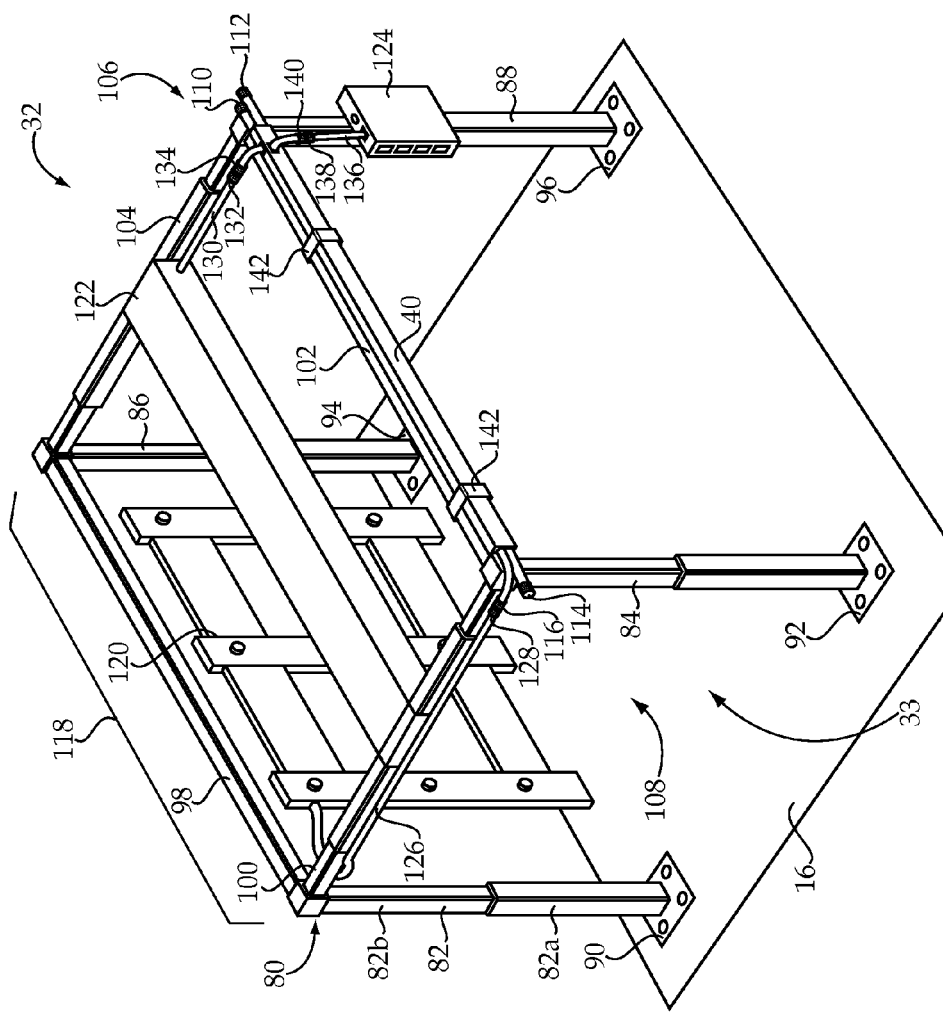
FIG. 2 is a diagrammatic perspective view of a manufacturing module of the manufacturing chain of FIG. 1, according to the present disclosure.

Turning now to FIG. 2, an exemplary manufacturing module 32 for supporting one or more of the modular manufacturing stations 18, 20, 22, 24, 26, and 28 of FIG. 1 is shown in greater detail. Specifically, the manufacturing module 32 may consist of a plurality of beams, such as tubular beams, forming a framework or skeleton 80. According to one embodiment, the skeleton 80 may include a plurality of vertically aligned support beams 82, 84, 86, and 88 attached to the planar floor 16 using support plates 90, 92, 94, and 96, respectively. Although a bolted connection is shown, it should be appreciated that the support beams 82, 84, 86, and 88 and/or support plates 90, 92, 94, and 96 may be attached to the planar floor 16 using any secure connection.

The vertically aligned support beams 82, 84, 86, and 88 may be interconnected using a plurality of additional support beams, such as horizontally aligned beams 98, 100, 102, and 104. The horizontally aligned support beams 98, 100, 102, and 104 and vertically aligned support beams 82, 84, 86, and 88 may define an entry 106 and an exit 108 of the manufacturing module 32, and may provide structural support for one or more modular manufacturing stations, such as the modular manufacturing stations 18, 20, 22, 24, 26, and 28 of FIG. 1. Together, the vertically aligned support beams 82, 84, 86, and 88, the horizontally aligned beams 98, 100, 102, and 104, and the planar floor 16 define the manufacturing space 33. The support beams 82, 84, 86, 88, 98, 100, 102, and 104 may be fabricated from steel, carbon composites, or any other material known in the art suitable for providing the desired support. According to one embodiment, it may be desirable to utilize a relatively lightweight material to ease the transport and/or construction of the manufacturing module 32.

Additionally, it may be desirable to allow for expansion and/or contraction of one or more of the support beams 82, 84, 86, 88, 98, 100, 102, and 104. Such expansion and/or contraction may further ease the transport and/or construction of the manufacturing module 32, and may also allow for a customized size and/or shape of each manufacturing module 32. For example, the desired size and/or shape of the manufacturing module 32 may depend upon a number of factors including, but not limited to, the number of modular manufacturing stations, such as modular manufacturing stations 18, 20, 22, 24, 26, and 28, disposed within the manufacturing module 32.

To facilitate adjustment, one or more of the support beams 82, 84, 86, 88, 98, 100, 102, and 104 may include a hollow tubular portion and a piston portion. For example, vertically aligned support beam 82 is shown having a tubular portion 82a and a piston portion 82b. As should be appreciated, the piston portion 82b may be slidably received within the tubular portion 82a and locked at a desired length. Locking may be accomplished using any known fastening devices, such as, for example, bolts, screw, pins, or spring-actuated bearings. Alternatively, however, each of the support beams 82, 84, 86, 88, 98, 100, 102, and 104 may be fabricated to various desired lengths, as dictated by the design of the manufacturing module 32. According to one embodiment, it may be desirable to expand and/or contract only the vertically aligned support beams 82, 84, 86, and 88.

Although the support beams 82, 84, 86, 88, 98, 100, 102, and 104 are illustrated as forming a cubic shape, they may, alternatively, be positioned to form any shape conducive to the specific manufacturing process being performed. Additionally, the number of support beams 82, 84, 86, 88, 98, 100, 102, and 104 utilized to form the skeleton 80 may vary depending upon the shape of the manufacturing module 32. The support beams 82, 84, 86, 88, 98, 100, 102, and 104 of the manufacturing module 32 may be secured together by mechanical fasteners, welds, or any other devices known in the art that are used to secure components. Additionally, the skeleton 80 of the manufacturing module 32 may be attached to the framework of a contiguous manufacturing module 32 using similar fasteners. Alternatively, however, the manufacturing module 32 may be positioned adjacent a contiguous manufacturing module 32 and may not be attached thereto. A "contiguous" manufacturing module, as used herein, may refer to a manufacturing module, such as manufacturing module 32, positioned in close proximity to another manufacturing module, such as, for example, a preceding or succeeding manufacturing module in the manufacturing chain 10.

One or more of the support beams 82, 84, 86, 88, 98, 100, 102, and 104 of the skeleton 80 may support the utility transfer module 40. The utility transfer module 40 may be configured to transfer at least one of electric power, fluid, and data through the manufacturing module 32. Specifically, the utility transfer module 40 may transfer and/or provide electric power, water, compressed air, gas, or other utilities to the one or more modular manufacturing stations, such as modular manufacturing stations 18, 20, 22, 24, 26, and 28, supported by the manufacturing module 32. According to one embodiment the utility transfer module 40 may include a collection of wires, cables, or other conduits capable of transferring one or more utilities.

The utility transfer module 40 may include an external port 110 for engaging an external utility connection, such as, for example, the external utility connection 36 of FIG. 1. Although the external utility connection 36 is positioned outside the building 14, it should be appreciated that the external utility connection 36 may be positioned within the building 14, such as within the manufacturing area 12. According to one embodiment, the external utility connection 36 includes a utility source, such as, for example, an electric power grid, a generator, a battery, a compressed air tank, a hydraulic tank, and/or a water supply. It should be appreciated that the external utility connection 36 may include any source of a utility that is utilized by the manufacturing chain 10. Accordingly, each utility transfer module 40 may include multiple external ports 110, depending on the number of utility sources to be engaged.

Each utility transfer module 40 may also include an entry port 112 for engaging a utility transfer module 40 of a preceding manufacturing module 32, and an exit port 114 for engaging a utility transfer module 40 of a succeeding manufacturing module 32. It should be appreciated that the entry port 112 of the utility transfer module 40 of the first manufacturing module 32 in the manufacturing chain 10 may remain unused and, similarly, the exit port 114 of utility transfer module 40 of the last manufacturing module 32 may remain unused. Such ports, however, may become necessary, such as, for example, when an additional manufacturing module 32 is added to the manufacturing chain 10.

Additionally, the utility transfer module 40 may include one or more equipment ports, such as a first equipment port 116, for providing a utility to the one or more modular manufacturing stations, such as the modular manufacturing stations 18, 20, 22, 24, 26, and 28, of the manufacturing module 32. According to a more general example, manufacturing module 32 may support a first modular manufacturing station 118 that is configured to perform at least one task of a manufacturing process. Accordingly, the first modular manufacturing station 118 may include equipment, and other systems and/or components, necessary to accomplish the task to be performed. Specifically, and according to one example, the first modular manufacturing station 118 may include a piece of manufacturing equipment 120, an article transportation device 122 representing a portion of the article transportation system 30 corresponding to the station 118, and a station control system 124. Although the manufacturing equipment 120 is exemplified as a plurality of air nozzles, similar to air nozzles 50, it should be appreciated that any manufacturing equipment useful in performing a manufacturing task is contemplated.

One or more of the manufacturing equipment 120, the article transportation device 122, and the station control system 124 may receive utilities, such as electric power, fluid, and data, from the utility transfer module 40. For example, the manufacturing equipment 120 may include a conduit 126 having a quick connect coupling member 128 for engaging the first equipment port 116. Similarly, the article transportation device 122 may include a conduit 130 having a quick connect coupling member 132 for engaging a second equipment port 134 of the utility transfer module 40. In addition, the station control system 124 may include conduit 136 having a quick connect coupling member 138 for engaging a third equipment port 140 of the utility transfer module 40.

It should be appreciated that any of the ports or connections described herein, such as, for example, ports 110, 112, 114, 116, 134, and 140, may embody electrical outlets, quick connect coupling members, or any other known utility interfaces. In addition, each of the quick connect coupling members 128, 132, and 138 may embody any appropriate utility interface for engaging one or more of the ports 110, 112, 114, 116, 134, and 140. It should also be appreciated that quick connect coupling members may enable relatively quick and easy assembly and/or disassembly of the manufacturing stations, such as modular manufacturing stations 18, 20, 22, 24, 26, and 28, and/or first modular manufacturing station 118. Additional benefits may be recognized by utilizing common, or universal, interfaces throughout the entire manufacturing chain 10.

According to one embodiment, the utility transfer module 40 may be secured to one of the support beams 82, 84, 86, 88, 98, 100, 102, and 104, such as support beam 102, using one or more mounting devices 142. Mounting devices 142 may, for example, include hooks, latches, sockets, or any other devices capable of securing the utility transfer module 40 to one or more of the support beams 82, 84, 86, 88, 98, 100, 102, and 104. Alternatively, however, the utility transfer module 40 may be positioned within a hollow portion, such as, for example, a central portion, of one or more of the tubular support beams 82, 84, 86, 88, 98, 100, 102, and 104. It should be appreciated that the utility transfer module 40 may be supported by and/or secured to any number of the support beams 82, 84, 86, 88, 98, 100, 102, and 104, as necessary to transfer a utility through and/or provide a utility to the manufacturing module 32.

Figure 3:
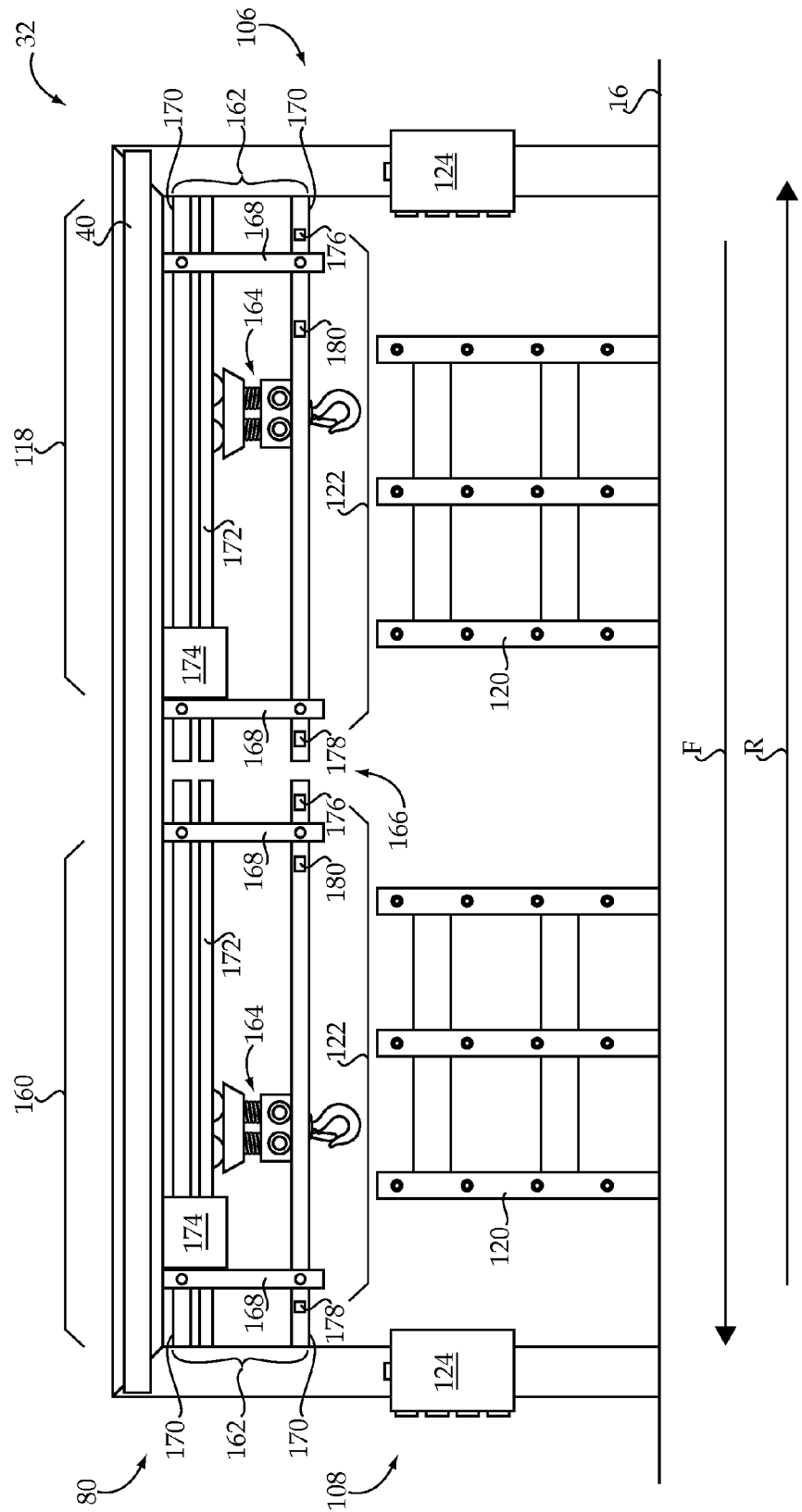
FIG. 3 is a side diagrammatic view of an alternative embodiment of the manufacturing module of FIG. 2, according to the present disclosure.

Turning now to FIG. 3, an alternative embodiment of a manufacturing module 32 is shown. Specifically, one or more of the manufacturing modules 32 may include a second modular manufacturing station 160 disposed between the entry 106 and the exit 108 of the manufacturing module 32. The second modular manufacturing station 160 may include similar systems and/or components as the first modular manufacturing station 118. Specifically, the second modular manufacturing station 160 may include at least one piece of manufacturing equipment 120, an article transportation device 122 representing a portion of article transportation system 30 corresponding to the second modular manufacturing station 160, and a station control system 124.

It should be appreciated that each of the systems and/or components of the second modular manufacturing station 160 may also receive a utility from the utility transfer module 40 in a manner similar to that described above. It should further be appreciated that either or both of the first and second modular manufacturing stations 118 and 160 may be representative of the modular manufacturing stations 18, 20, 22, 24, 26, and 28 of FIG. 1. Accordingly, each of the modular manufacturing stations 18, 20, 22, 24, 26, and 28 may generally include one or more of the manufacturing equipment 120, article transportation device 122, and station control system 124.

Each article transportation device 122 may include a friction drive system or, according to some specific embodiments, an overhead friction drive system, having one or more sets of carrier tracks, such as carrier tracks 162, along which a carrier 164 may be transported. It should be appreciated that the one or more sets of carrier tracks 162 may be operationally aligned to define a transportation path 166 through a manufacturing chain, such as the manufacturing chain 10 of FIG. 1. Friction drive systems are known, and may generally include one or more hanger rails 168 fixedly attached to the skeleton 80 for supporting one or more support rails 170. At least one of the support rails 170 may provide support for a drive shaft 172 that may be mechanically coupled to a drive system 174.

The drive system 174 may, for example, include an electric, hydraulic, or pneumatic motor, and may further include a transmission and controls, as necessary, for driving the drive shaft 172 at a desired speed and in a desired direction. For example, the drive shaft 172 may be rotated in a first direction for frictionally engaging wheels of the carrier 164 such that the carrier 164 is moved in a forward transport direction, represented by arrow "F". Alternatively, however, the drive shaft 172 may be rotated, by the drive system 174, in an opposite direction for frictionally engaging wheels of the carrier 164 to move the carrier 164 in a reverse transport direction "R" that is opposite the forward transport direction "F." A similar friction drive system may be provided by OCS IntelliTrak, Incorporated of Cincinnati, Ohio.

Although a friction drive system is described, however, it should be appreciated that a variety of material handling systems may be used. For example, an air balancer, a series of hoists, an electrified monorail, or any other device capable of moving an article through the manufacturing chain 10 are also contemplated. Further, it should be appreciated that carriers, such as carriers 164, may include any devices capable of gripping an article, such as a suspended article, to be conveyed through the manufacturing chain 10. Exemplary carriers may, for example, include hooks, clamps, latches, or any other devices capable of temporarily grasping the article. Although a single carrier 164 is depicted for transporting an article, it should be appreciated that multiple carriers may be necessary for transporting the article, depending on the size and weight of the article.

It is also contemplated that the article transportation system 30 may be substituted with a chain, belt, or any other device that may convey carriers 164 through the manufacturing chain 10. According to one embodiment, the article transportation system 30 may be mounted to the planar floor 16 and/or contain a transport device, such as, for example, a conveyor belt to convey the article through the manufacturing chain 10. Preferably, however, the article transportation devices 122 that define the article transportation system 30 may each include at least one drive system 174, or similar means, for facilitating independent movement of the carrier 164 within the respective one of the manufacturing stations 118 and 160.

Each station control system 124 may be configured to control operation of at least one of the article transportation device 122 and the manufacturing equipment 120 of the respective one of the modular manufacturing stations 118 and 160. Specifically, the station control system 124 may be in communication with the article transportation device 122 or, more specifically, the drive system 174, and may be configured to issue an operation signal, such as, for example, a forward signal, a reverse signal, and a stop signal. The forward signal may correspond to the forward transport direction "F," the reverse signal may correspond to the reverse transport direction "R," and the stop signal may correspond to a stationary position. It should be appreciated that the stationary position may represent a state in which the carrier 164 is not driven in either of the forward transport direction "F" or the reverse transport direction "R".

According to one embodiment, the carrier 164 of the first modular manufacturing station 118 may be driven in the forward transport direction "F" while the carrier 164 of the second modular manufacturing station 160 is simultaneously driven in the reverse transport direction "R" or, alternatively, remains stationary. According to a specific example, it may be desirable to move the carrier 164 of the second modular manufacturing station 160 in the reverse transport direction "R" relative to the manufacturing equipment 120. As should be appreciated, continuous forward and reverse movement relative to the manufacturing equipment 120 may prove beneficial in a variety of tasks of a manufacturing process, including, but not limited to, a wash task and a blow off task, as described above. According to an additional example, it may be desirable to stop the carrier 164 of the second modular manufacturing station 160, such as in response to the identification of a defect, while one or more other carriers 164 continue to move. A variety of defects are contemplated, such as, for example, defects resulting from process problems and/or equipment failures.

Each modular manufacturing station 118 and 160 may also include one or more position tracking devices. According to one embodiment, a first position tracking device 176, a second position tracking device 178, and a third position tracking device 180 are each positioned for detecting a position of the carrier 164 as it is transported through the station 118 and 160. Position tracking devices 176, 178, and 180 are known, and may include, for example, position sensors, proximity switches, bar code readers, or any other devices capable of detecting a position of the carrier 164. In addition, the position tracking devices 176, 178, and 180 may be supported by the skeleton 80, the article transportation device 122, or may be otherwise positioned. Although three position tracking devices 176, 178, and 180 are shown, it should be appreciated that any number of position tracking devices may be used, as dictated by the manufacturing process.

Each station control system 124 may also be in communication with the position tracking devices 176, 178, and 180, and may receive signals from one or more of the position tracking devices 176, 178, and 180 that are indicative of first, second, and third detected positions of the carrier 164. Each station control system 124 may also be configured to issue one or more operation signals, such as, for example, the forward signal, reverse signal, and stop signal, to the article transportation device 122 based, at least in part, on one of the detected carrier positions. According to one example, it may be desirable for the station control system 124 to issue the stop signal to the article transportation device 122 when the carrier 164 has reached a predetermined position relative to the manufacturing equipment 120. After a predetermined period of time, for example, the station control system 124 may then issue the forward signal to the article transportation device 122. Further, the station control system 124 may issue one or more operation signals to the manufacturing equipment 120 based, at least in part, on one of the detected carrier positions.

Figure 4:
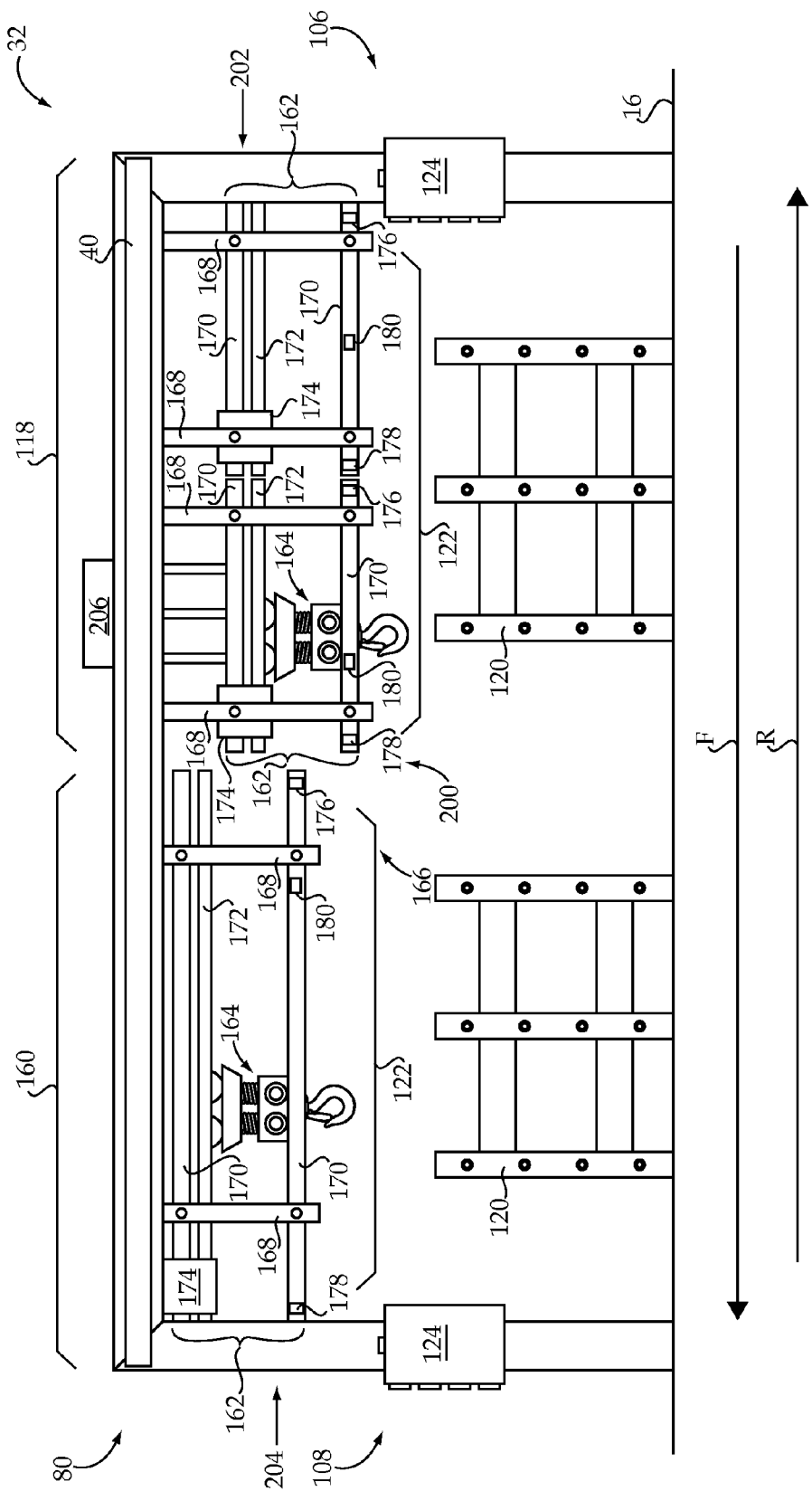
FIG. 4 is a side diagrammatic view of an alternative embodiment of the manufacturing module of FIG. 2 including a first vertical lift device, according to the present disclosure.

Turning now to FIG. 4, an alternative embodiment of a manufacturing module 32 is shown. Specifically, the transportation path 166 defined by the carrier tracks 162 may include a vertical discontinuity 200. It should be appreciated that, according to one example, the vertical discontinuity 200 may occur where the transportation path 166 includes a first transport height 202 that is vertically spaced from a second transport height 204. Specifically, the two sets of carrier tracks 162 of the first modular manufacturing station 118 may be positioned at the first transport height 202, while the carrier tracks 162 of the second modular manufacturing station 160 are positioned at the second transport height 204. Such a discontinuity along the transportation path 166 may occur as a result of the design of the manufacturing chain 10, as dictated by a topography of the manufacturing area 12 or a variety of other factors. Additionally, it may be desirable to alter the height of the transportation path 166 relative to the manufacturing equipment 120.

A first vertical lift device 206 may be provided for moving one of the sets of carrier tracks 162 in a vertical direction relative to the transportation path 166. Specifically, the first vertical lift device 206 may be configured to move one of the sets of carrier tracks 162, adjacent the vertical discontinuity 200, from the first transport height 202 to the second transport height 204. Vertical lift devices, such as vertical lift device 206, are known, and may include, for example, electric or pneumatic lifts, and, as such, may receive any necessary utilities from the utility transfer module 40. In addition, the first vertical lift device 206 may be supported by and/or secured to the skeleton 80 of the manufacturing module 32.

A control system, such as, for example, the station control system 124, may also be provided for controlling operation of the first vertical lift device 206. Specifically, and according to one embodiment, the station control system 124 may also be in communication with the first vertical lift device 206, and may be configured to issue operation signals thereto, such as, for example, a raise signal and a lower signal. For example, the first vertical lift device 206 may be configured to move the carrier tracks 162 from the first transport height 202 to the second transport height 204 in response to the raise signal. In addition, the first vertical lift device 206 may be configured to move the carrier tracks 162 from the second transport height 204 to the first transport height 202 in response to the lower signal.

Further, the station control system 124 may be configured to issue the raise signal and/or the lower signal in response to a carrier position that is detected by one of the position tracking devices 176, 178, and 180. Specifically, and according to one example, it may be desirable to issue the raise signal when it is determined that the carrier 164 has reached a predetermined position relative to the carrier tracks 162. After the carrier tracks 162 have been raised, the carrier 164 may continue to be transported along the transportation path 168 at the second transport height 204, such as by the drive system 174.

Figure 5:
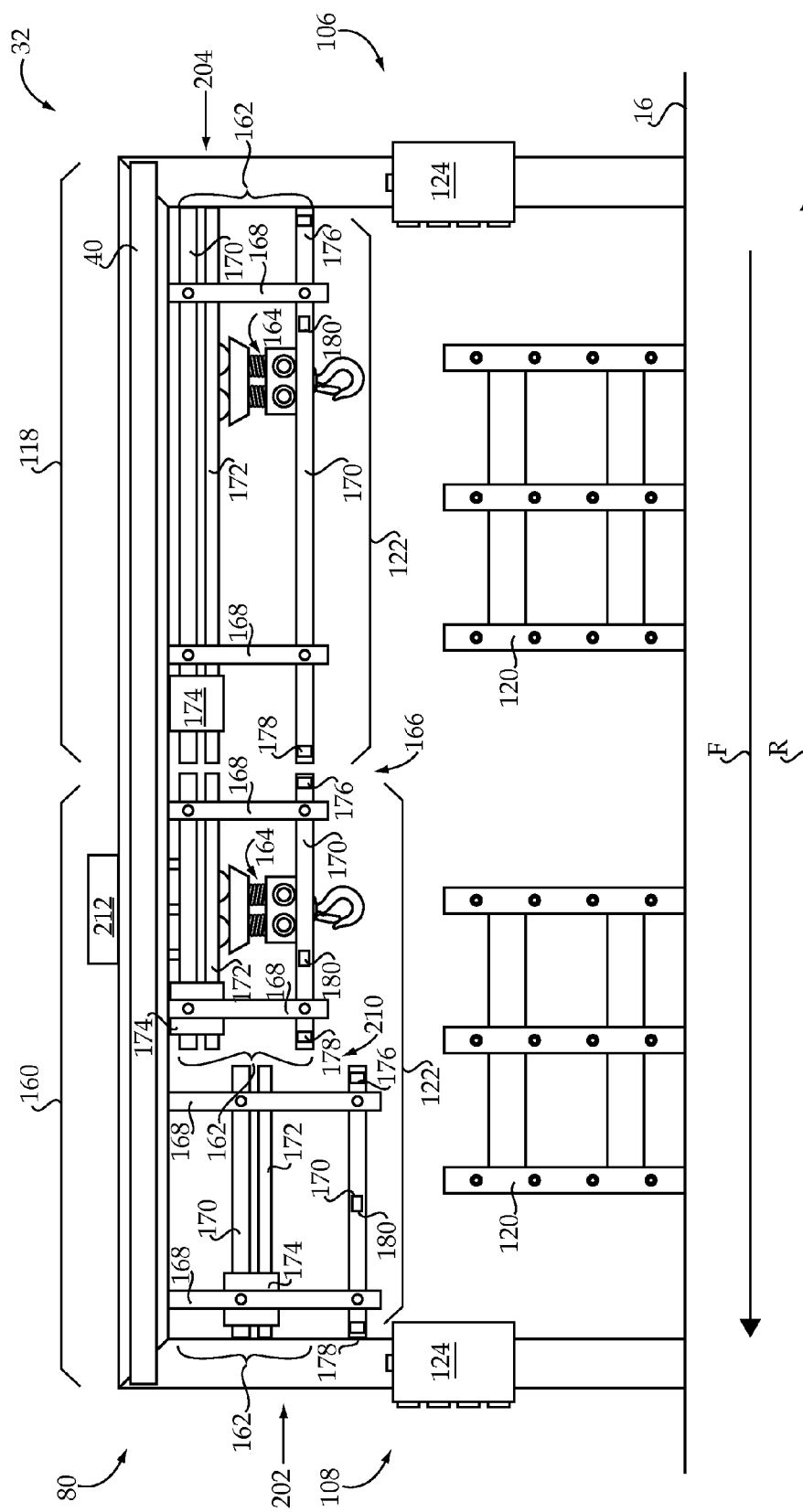
FIG. 5 is a side diagrammatic view of an alternative embodiment of the manufacturing module of FIG. 2 including a second vertical lift device, according to the present disclosure.

The transportation path 168 may include additional vertical discontinuities, such as, for example, a second vertical discontinuity 210, shown in FIG. 5. A second vertical lift device 212, similar to first vertical lift device 206, may, therefore, be provided to advance the carrier 164 through the second vertical discontinuity 210. Specifically, the second vertical lift device 212 may move the carrier tracks 162 from the second transport height 204 to the first transport height 202, such as in response to the lower signal issued from the station control system 124. It should be appreciated that the station control system 124 may issue the lower signal in response to a carrier position detected by one of the position tracking devices 176, 178, and 180. It should also be appreciated that any number of vertical lift devices, such as lift devices 206 and 212 that may be manually or automatically operated, may be used throughout the manufacturing chain 10 to accommodate vertical discontinuities and/or to move one of the carriers 164 in a vertical direction relative to the manufacturing equipment 120.

According to one embodiment, it may be desirable to incorporate one or more vertical lift devices, such as the lift devices 206 and 212, into the manufacturing chain 10 to accommodate manufacturing equipment 120 positioned above the planar floor 16. Specifically, the manufacturing chain 10 may include one or more pieces of manufacturing equipment 120 that traditionally were positioned below the planar floor 16, such as, for example, tanks or baths. For ease of deployment, the manufacturing chain 10 may position all equipment 120, including such tanks or baths, above ground and, therefore, may advance the carriers 164 through the manufacturing chain 10 and relative to the manufacturing equipment 120 using one or more vertical lift devices 206 and 212.

It should be appreciated that utilizing an article transportation device 122 having at least one of reverse, stop, and lift capabilities may allow a decrease in size and/or output capacity of the manufacturing equipment 120. For example, a conventional curing station may require a relatively large infrared heater capable of generating a large amount of heat. Specifically, the infrared heater may be sized to adequately cure a coating of paint on an article as it passes through the curing station at a speed equal to an overall line speed. However, the article transportation device 120, as described herein, may stop and/or reverse the article as it passes through the curing station 26. Therefore, the manufacturing equipment 120 or, more specifically, the infrared heaters used therein may have a lower heat output requirement. As a result, significant cost savings relative to the manufacturing equipment 120 may be recognized.

Figure 6:
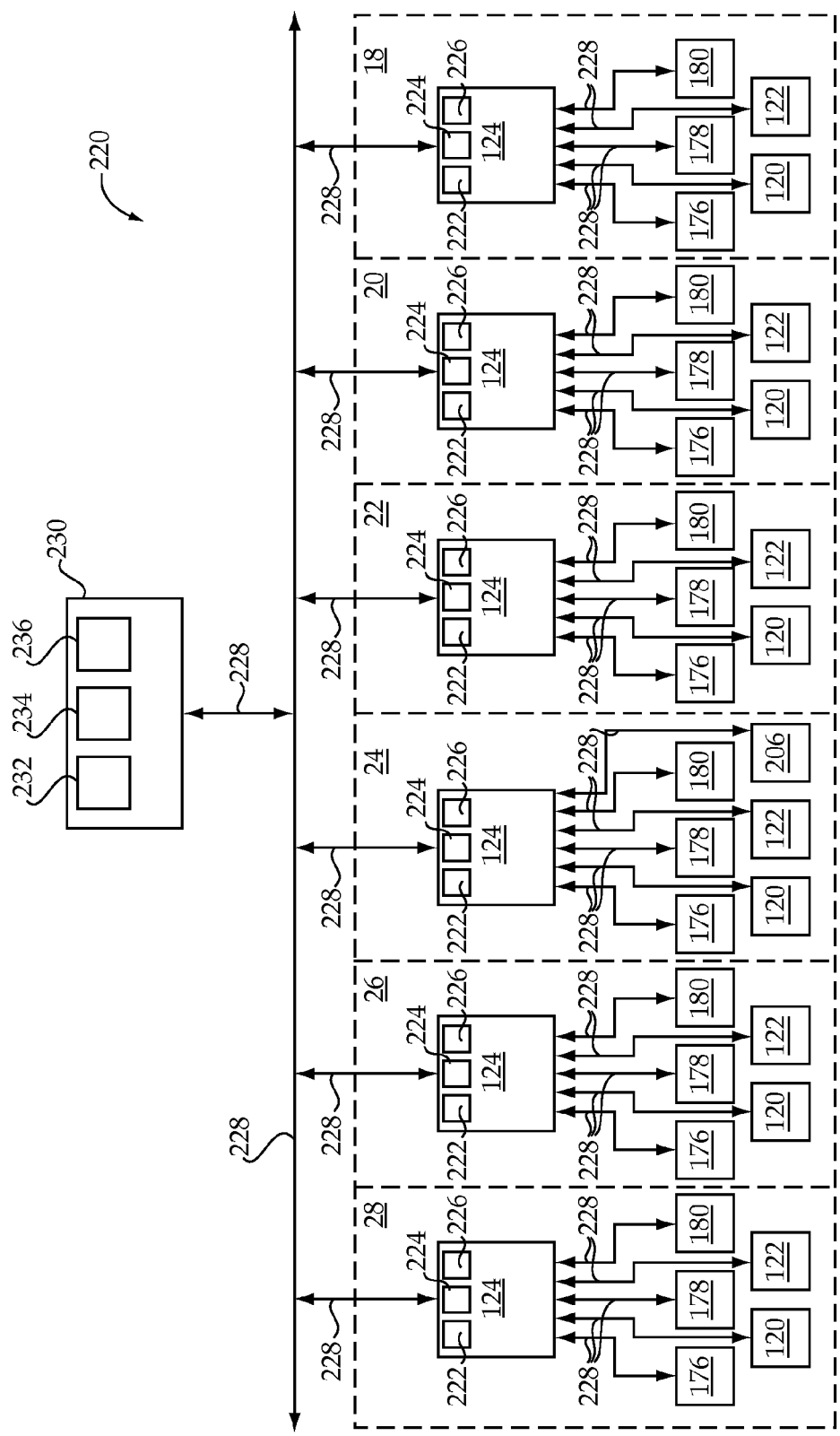
FIG. 6 is a block diagram of one embodiment of a control system for operating the manufacturing chain of FIG. 1, according to the present disclosure.

An exemplary control system 220 for the manufacturing chain 10 is shown generally in FIG. 6. Specifically, the control system 220 may include the station control systems 124 of each modular manufacturing station within the manufacturing chain 10, such as the modular manufacturing stations 18, 20, 22, 24, 26, and 28. It should be appreciated that the modular manufacturing stations 18, 20, 22, 24, 26, and 28 of FIG. 1 may include configurations similar to any of the embodiments of the first and second modular manufacturing stations 118 and 160 of FIGS. 2-5. Specifically, the manufacturing modules 32 of the manufacturing chain 10, as shown in FIG. 1, may each include one or more of the modular manufacturing stations 18, 20, 22, 24, 26, and 28, as dictated by the manufacturing process to be performed.

The station control systems 124 may include any commercially available microprocessors that include means for controlling the operation of at least one of the article transportation device 122 and the manufacturing equipment 120 of the respective manufacturing stations 18, 20, 22, 24, 26, and 28. Generally, each station control system 124 may include a processor 222, a memory 224, and any other components for running an application. Various circuits may also be associated with the station control systems 124, such as utility supply circuitry, signal conditioning circuitry, and any other types of circuitry needed for the operation of the respective manufacturing stations 18, 20, 22, 24, 26, and 28.

The station control systems 124 may each receive input from an operator interface 226, and may control and/or override the operation of the article transportation device 122 and/or manufacturing equipment 120 of the respective manufacturing stations 18, 20, 22, 24, 26, and 28 in response to the input. As should be appreciated, the operator interface 226 may receive an operator input command that is indicative of a desired operation. Accordingly, the operator interface 226 may include a touch screen, keyboard, control panel, or any other device or mechanism capable of facilitating communication between the operator and the station control systems 124. It is also contemplated that the input could alternatively be a computer-generated command from an automated system that assists the operator, or an autonomous system that operates in place of the operator.

According to one embodiment, the memory 224 of each station control system 124 may include a unique operation pattern corresponding to a specific task stored thereon. For example, the unique operation pattern may include one or more operation signals to be transmitted to at least one of the article transportation device 122 and the manufacturing equipment 120 via at least one communications conduit 228. Such operation signals may, for example, include the forward signal, the reverse signal, and the stop signal, as described above. In addition, the raise signal and the lower signal may be issued to an article transportation device 122 that includes a vertical lift device, such as vertical lift devices 206 and 212. Further, operation signals, such as, for example, a begin operation signal and a stop operation signal that may, intuitively, start or stop operation of the manufacturing equipment 120, may also be issued. It should be appreciated that a "unique operation pattern," as used herein, may generally refer to any sequence or pattern of movements or operations that facilitate the performance of a task, including such parameters as speed and direction of travel.

Each of the station control systems 124 may issue an operation signal, as describe above, in response to an operator input or, alternatively, automatically and according to a predetermined pattern, such as corresponding to the unique operation pattern stored thereon. According to one embodiment, the station control systems 124 may be in communication with the position tracking devices 176, 178, and 180 via the communications conduit 228, and may be configured to receive signals indicative of detected carrier positions. The station control systems 124 may also be configured to issue at least one of the operation signals corresponding to the unique operation pattern, based, at least in part, on one or more of the detected carrier positions.

A main control system 230 may be provided for coordinating operation of the station control systems 124 of each modular manufacturing station 18, 20, 22, 24, 26, and 28. Alternatively, however, one of the station control systems 124 may be designated a master control system for coordinating operation of the manufacturing chain 10. The main control system 230 may be of standard design and may generally include a processor 232, such as, for example, a central processing unit, a memory 234, and an input/output circuit, such as the communications conduit 228. It should be appreciated that the communications conduit 228, as referenced herein, may represent any form of wired and/or wireless communications, and may generally represent the transmission of any of the operation signals and/or positions signals described above. According to one embodiment, one or more data communications may be transmitted via the utility transfer modules 40.

The processor 232 may control operation of the main control system 230 by executing operating instructions, such as, for example, programming code stored in the memory 234, wherein operations may be initiated internally or externally to the main control system 230. As should be appreciated, a control scheme may be utilized that monitors outputs of the systems and/or components of each modular manufacturing station 18, 20, 22, 24, 26, and 28, such as, for example, sensors, actuators, or control units, via the communications conduit 228. Such information may, for example, be used to control inputs to the station control systems 124 and/or other systems and components of the each of the modular manufacturing stations 18, 20, 22, 24, 26, and 28.

According to one example, the memory 234 of the main control system 230 may store a plurality of unique operation patterns thereon. The main control system 230 may receive signals indicative of the first, second, and third detected carrier positions from each of the station control systems 124. In response, the main control system 230 may independently transmit operation signals, such as operation signals corresponding to one of the unique operation patterns, to each of the station control systems 124. The station control systems 124 may, in turn, transmit the operation signals to the article transportation device 122 and/or the manufacturing equipment 120 at the respective stations 18, 20, 22, 24, 26, and 28. Thus, the main control system 230 may simultaneously control a first article at a first station according to one unique operation pattern, and control a second article at a second station according to a different unique operation pattern.

The main control system 230 may also index the carriers 164 of each modular manufacturing station 18, 20, 22, 24, 26, and 28 as each carrier 164 traverses to a contiguous station 18, 20, 22, 24, 26, and 28. According to one embodiment, the main control system 230 may simultaneously issue an index signal to the station control systems 124 of each modular manufacturing station 18, 20, 22, 24, 26, and 28. As such, the processors 222 of each station control system 124 may be configured to await and/or anticipate the index signal from the main control system 230 after the task to be performed at the respective station has been completed.

According to one example, indexing may include detecting a desired position of the carrier 164 within each station 18, 20, 22, 24, 26, and 28, such as by using one or more of the position tracking devices 176, 178, and 180. The main control system 230 may be configured to await signals from each modular manufacturing station 18, 20, 22, 24, 26, and 28 that are indicative of the desired position and then simultaneously transfer each carrier 164 to a contiguous station 18, 20, 22, 24, 26, and 28. Additional operation signals, therefore, may also be useful for indexing, such as, for example, the stop signal, a speed adjust signal, a transfer signal, or any other signal useful for detecting and transferring the carriers 164.

By coordinating operation of the entire manufacturing chain 10, the main control system 230 may receive a carrier position signal from one modular manufacturing station and issue an operation signal to another manufacturing stations based, at least in part, on that carrier position signal. For example, it may be desirable to transfer the carrier 164 of modular manufacturing station 18 only when the carrier 164 of the modular manufacturing station 20 has reached a predetermined position, such as a position detected by one or more of the position tracking devices 176, 178, and 180. It should be appreciated that the main control system 230 may utilize position signals from all of the position tracking devices 176, 178, and 180, at least in part, to coordinate operation of the entire manufacturing chain 10.

The main control system 230 may also include an operator interface, such as an interactive operator display 236, for continuously monitoring and/or controlling operation of each modular manufacturing station 18, 20, 22, 24, 26, and 28 of the manufacturing chain 10. According to one embodiment, the interactive operator display 236 may be used to continuously monitor a status of each article transportation device 122 of the manufacturing chain 10. Further, the interactive operator display 236 may be configured to display a real-time visual representation of each carrier 164 being transported through the manufacturing chain 10. The interactive operator display 236 may also be configured to receive an operator input command from an operator and transmit the operator input command to the article transportation device 122 or the manufacturing equipment 120 of at least one of the modular manufacturing stations 18, 20, 22, 24, 26, and 28.

Figure 7:
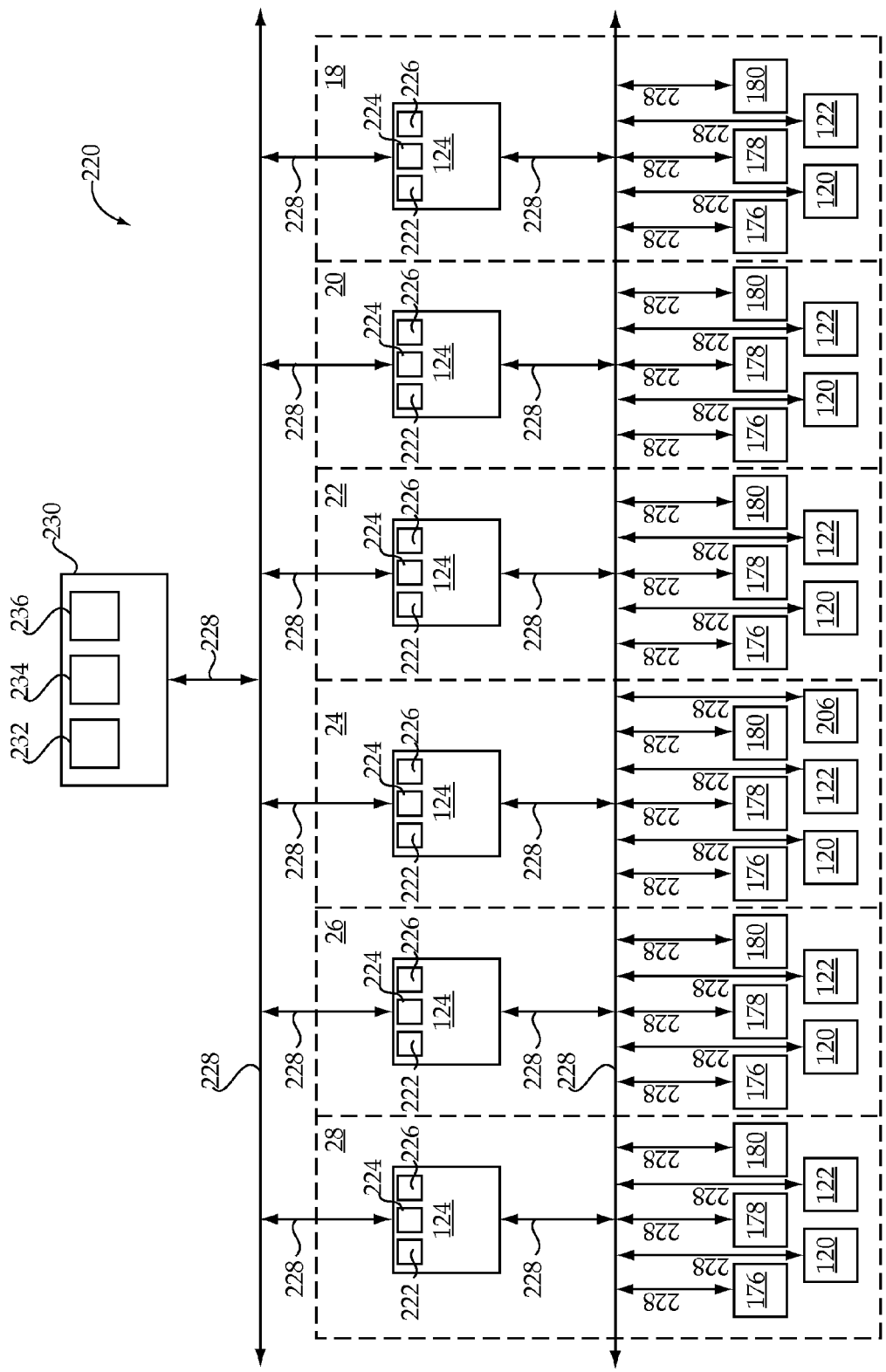
FIG. 7 is a block diagram of an alternative embodiment of a control system for operating the manufacturing chain of FIG. 1, according to the present disclosure.

It should be appreciated that numerous applications and configurations of the control system 220 are contemplated. According to one embodiment, the main control system 230, station control systems 124, position tracking devices 176, 178, and 180, article transportation devices 122 and manufacturing equipment 120 may all be interconnected through a local area network, as shown in FIG. 7. As such, the main control system 230 may directly communicate with the systems and/or components of each modular manufacturing station 18, 20, 22, 24, 26, and 28, and, therefore, may not direct communications, including operation signals, through the station control systems 124. Similarly, position signals may be communicated directly from the position tracking devices 176, 178, and 180 to the main control system 230.

An exemplary embodiment of a material handling system for use with the modular manufacturing chain 10, or modular manufacturing line, described herein is shown generally at 250. The material handling system 250, only a portion of which is shown, may include a composite beam 252 having an upper rail 254 and a lower track 256 connected through a plurality of spaced apart transverse members 258. As shown later in greater detail, the lower track 256 may define two parallel channels 260. A trolley 262, several of which are shown, may include a lower set of wheels 264 that may be received within the two parallel channels 260 of the lower track 256. The lower track 256, along which the trolley 262 is movable, may define a rail of any standard size, including, for example, a 3", 4", or 6" rail. An upper set of wheels 266 of the trolley 262 may be in frictional engagement with a drive tube 268 of a friction drive system 270. The friction drive system 270, which may include a spinning tube friction drive system as provided by OCS IntelliTrak of Cincinnati, Ohio, may be similar to an exemplary embodiment of the article transportation device 122 described above, and may generally include a plurality of drive tubes 268 supported along the material handling system 250 and positioned in series to define a path through the modular manufacturing chain 10 (FIG. 1). Each of the plurality of drive tubes 268 may be independently driven, or rotated, by one of a plurality of motors, such as electric drive motor 272. Therefore, depending on the number and length of independently driven drive tubes 268, the material handling system 250, or modular material handling system 250, may be customized to independently control each article as it is transported through the manufacturing chain 10.

As shown in the illustrated embodiment, a first trolley assembly 274 may be configured to support a first load bar 276. Specifically, a first end 278 of the first load bar 276 may be pivotably supported from a first trolley 280, while a second end 282 of the first load bar 276 may be pivotably supported from a second trolley 284. Similarly, second trolley assembly 285 may be configured to support a second load bar 286. More specifically, a first end 288 of the second load bar 286 may be pivotably supported from a third trolley 290, and a second end 292 of the second load bar 286 may be pivotably supported from a fourth trolley 294. A carrier 296, which may include any devices capable of gripping an article to be conveyed along the modular material handling system 250, may have a first end 298 pivotably supported from the first load bar 276 and a second end 300 pivotably supported from the second load bar 286. While a carrier, such as carrier 296, may be configured to support an article, load bars, such as first and second load bars 276 and 286, may be configured to evenly distribute weight carried by the carrier 296 among a plurality of trolleys 262. One skilled in the art should appreciate that a trolley assembly, such as first trolley assembly 274 and second trolley assembly 285, may include any number of trolleys 262 configured to directly or indirectly support a carrier, such as carrier 296. Further, a load bar assembly, such as the illustrated load bar assembly 302, may include any number of trolleys 262 or trolley assemblies 274 and 285 supporting any number of load bars 276 and 286. Such arrangements may be customized based on the weight to be supported by the carrier 296.

According to another arrangement, one or more of the trolleys 262 may include a coupling mechanism for attaching the trolley 262 to another trolley 262. For example, the front of one trolley 262 may include coupling means configured to attach to complementary coupling means provided on the back of another trolley 262. Alternatively, similar coupling means may be provided to attach carriers, such as carrier 296, or load bars, such as load bars 276 or 286. Any such arrangements may be similar, in purpose, to conventional couplings for attaching train cars to one another for pulling the train cars in a train. As such, one or more trolleys 262, or carriers 296, may be transported along the material handling system 250 in a coupled configuration. Such a coupled configuration may, for example, be useful when transporting similar articles or when transporting different articles that may be later combined into an assembly or a sub-assembly.

Although not depicted, it should be appreciated that a single trolley 262, which may also be referenced as a trolley assembly, may be configured to directly support a carrier, such as carrier 296. As such, the friction drive system 270, and trolley 262, may be configured to ensure that at least one of the wheels of the upper set of wheels 266 continuously engages one of the drive tubes 268. Specifically, the wheels of the upper set of wheels 266 may bridge any gaps, such as gap 304, between drive tubes 268 of the friction drive system 270. For trolley assemblies, such as trolley assemblies 274 and 285, which may include one or more trolleys 262 connected through one or more load bars, such as load bar 276, and/or carriers, such as carrier 296, it may be important to ensure that at least one of the trolleys 262 continuously engages one of the plurality of drive tubes 268.

The trolleys 262, described herein, may be of standard design, requiring a lower set of wheels 264, movable along the lower track 256, and an upper set of wheels 266 that are configured to frictionally engage the plurality of drive tubes 268. Such trolleys 262, according to one embodiment, may be modified versions of conventional power and free conveyor trolleys, or other trolleys known to those skilled in the art. To incorporate such standard components, a drive adapter may be provided that attaches a standard trolley, having lower wheels that are movable within the lower track 256, to the upper set of wheels 266, described herein. The upper wheels 266, as should be appreciated, are configured to frictionally engage the plurality of drive tubes 268. By incorporating such conventional components, such as by slightly modifying standard trolleys as described herein, costs of implementing the material handling system 250 may be reduced.

Figure 8:
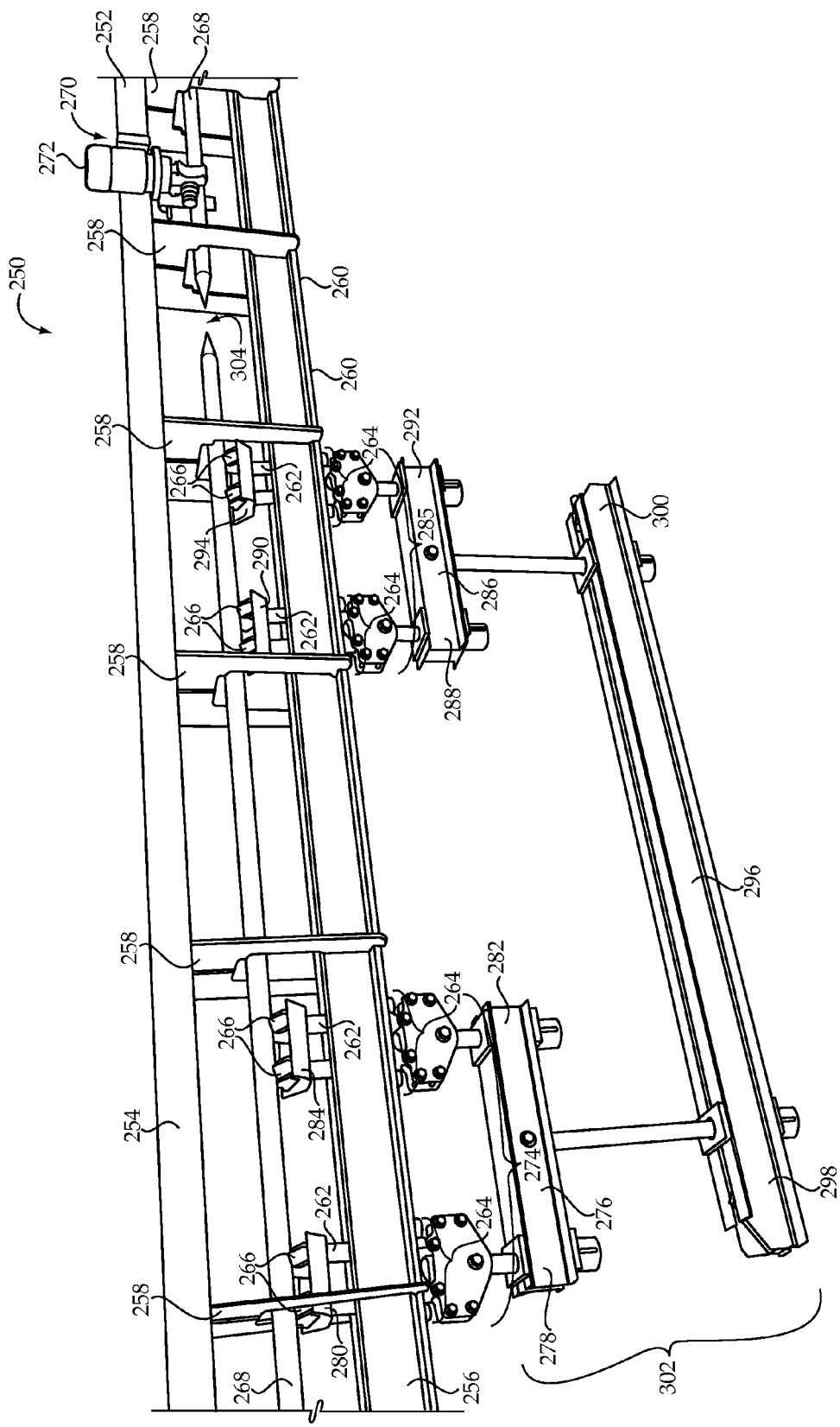
FIG. 8 is a perspective view of one embodiment of a modular material handling system, according to the present disclosure.
Figure 9C:
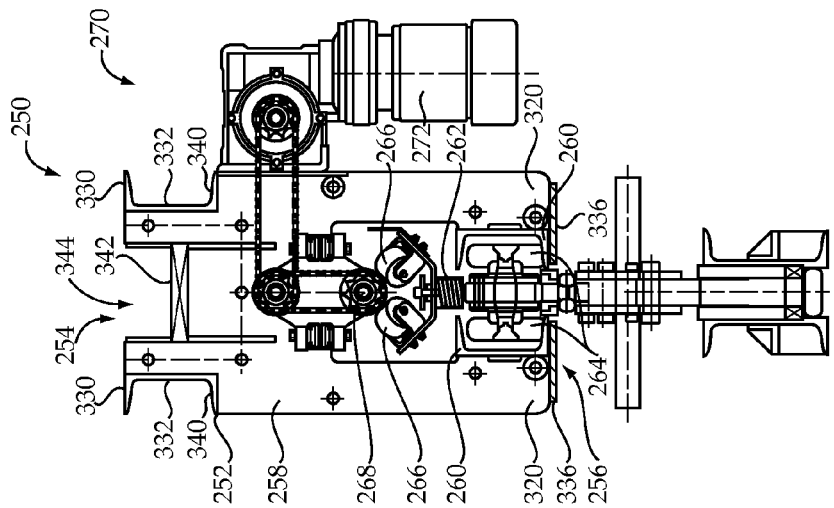
FIG. 9c is a cross-sectional view of a third exemplary composite beam for use with the modular material handling system of FIG. 8, according to the present disclosure.
Figure 9B:
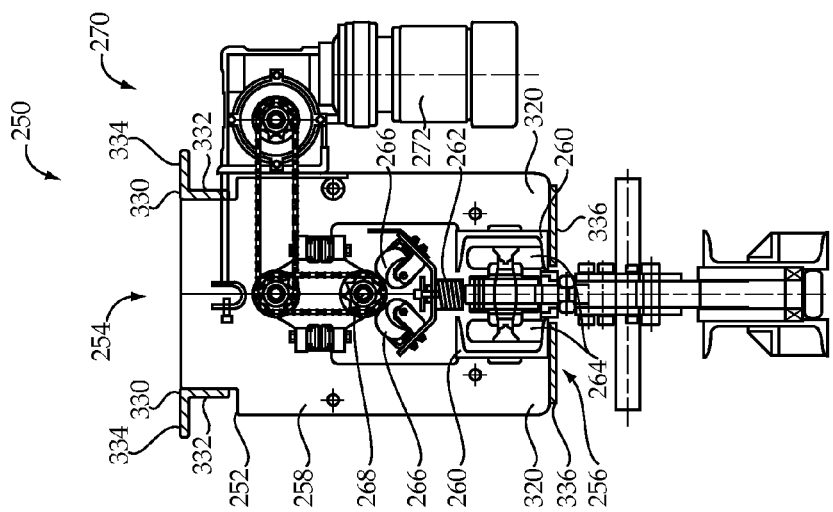
FIG. 9b is a cross-sectional view of a second exemplary composite beam for use with the modular material handling system of FIG. 8, according to the present disclosure.
Figure 9A:
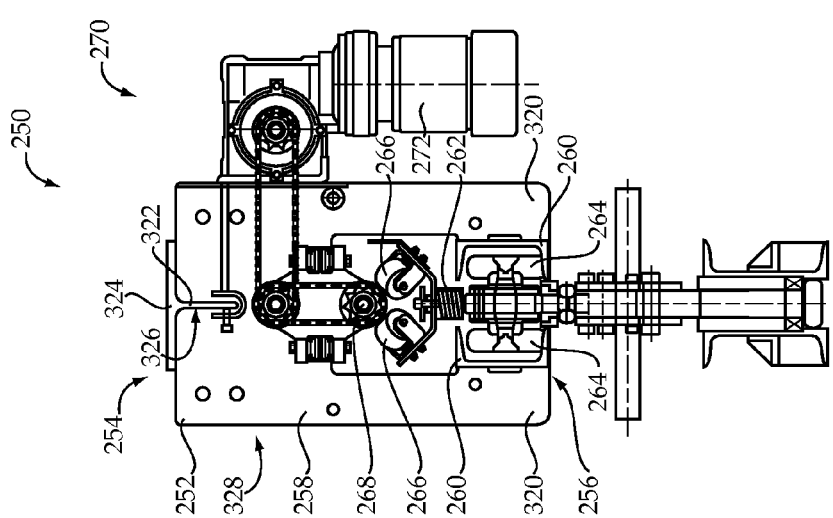
FIG. 9a is a cross-sectional view of a first exemplary composite beam for use with the modular material handling system of FIG. 8, according to the present disclosure.

Turning now to FIGS. 9a-9c, cross-sectional views of alternative embodiments of the composite beam 252 are shown. Specifically, the composite beam 252 of FIG. 9a may include the upper rail 254 and lower track 256 connected through transverse members 258, as described above with reference to FIG. 8. As shown, each of the transverse members 258 may have an inverted U-shaped cross-section defining a pair of free ends 320. Each of the free ends 320 may support one of channels 260, which may be generally C-shaped channels, of the lower track 256. The channels 260, according to one embodiment, may be welded, or otherwise permanently affixed, to each of the plurality of transverse members 258. Although alternative attachment methods are contemplated, welding may be preferred to provide increased structural strength of the composite beam 252 and, further, may allow the transverse members 258 to be positioned at longer centers. The upper rail 254, as shown in FIG. 9a, may, according to one embodiment, include a T-shaped cross-section defining a central web 322 and a transverse flange 324. The central web 322, which may extend the length of the composite beam 252, may be received, and permanently affixed, within a vertically aligned slot 326 of an upper portion 328 of each of the transverse members 258.

According to alternative embodiments, shown in FIGS. 9b and 9c, the upper rail 254 of the composite beam 252 may include a pair of oppositely oriented structural members 330. Each of the structural members 330 may include a vertically oriented web 332 that is secured to each of the transverse members 258. Turning specifically to FIG. 9b, each of the structural members 330 may be in the form of an angle iron having the vertically oriented web 332 and a horizontally oriented flange 334. The horizontally oriented flange 334, along with the transverse flange 324 of the embodiment of FIG. 9a, may be used to secure a position of the composite beam 252 along the modular manufacturing chain 10 (FIG. 1), as described below in greater detail. According to this embodiment, and alternative embodiments, the composite beam 252 may also include a horizontally aligned support plate 336 secured to each of the pair of free ends 320 of the transverse members 258 and/or the channels 260 of the lower track 256.

The structural members 330, according to the embodiment of FIG. 9c, may include the vertically oriented webs 332, which may be attached to the transverse members 258, and the horizontally oriented flanges 334, which may be used to attach the composite beam 252 to another structure. In addition, the structural members 330, as shown in FIG. 9c, may include horizontally oriented flanges 340 that may be fixedly attached to each of the plurality of transverse members 258. Also shown in the embodiment of FIG. 9c, the composite beam 252 may include a cable tray 342 supported, or defined, by the composite beam 252. Specifically, the cable tray 342 may extend a length of the composite beam 252 and may be received, and secured, within openings 344 defined by the transverse members 258. Alternatively, the cable tray 342 may not extend the length of the composite beam 252, but may be defined only by the openings 344 of the transverse members 258. The cable tray 342 may be provided to accommodate one or more cables or conduits provided along the manufacturing chain 10. For example, the cable tray 342 may accommodate the utility transfer module 40, described above, which may be configured to transfer a utility, such as, for example, electric power, fluid, or data, through the modular manufacturing chain 10 of FIG. 1, or another similar chain or line.

Figure 10:
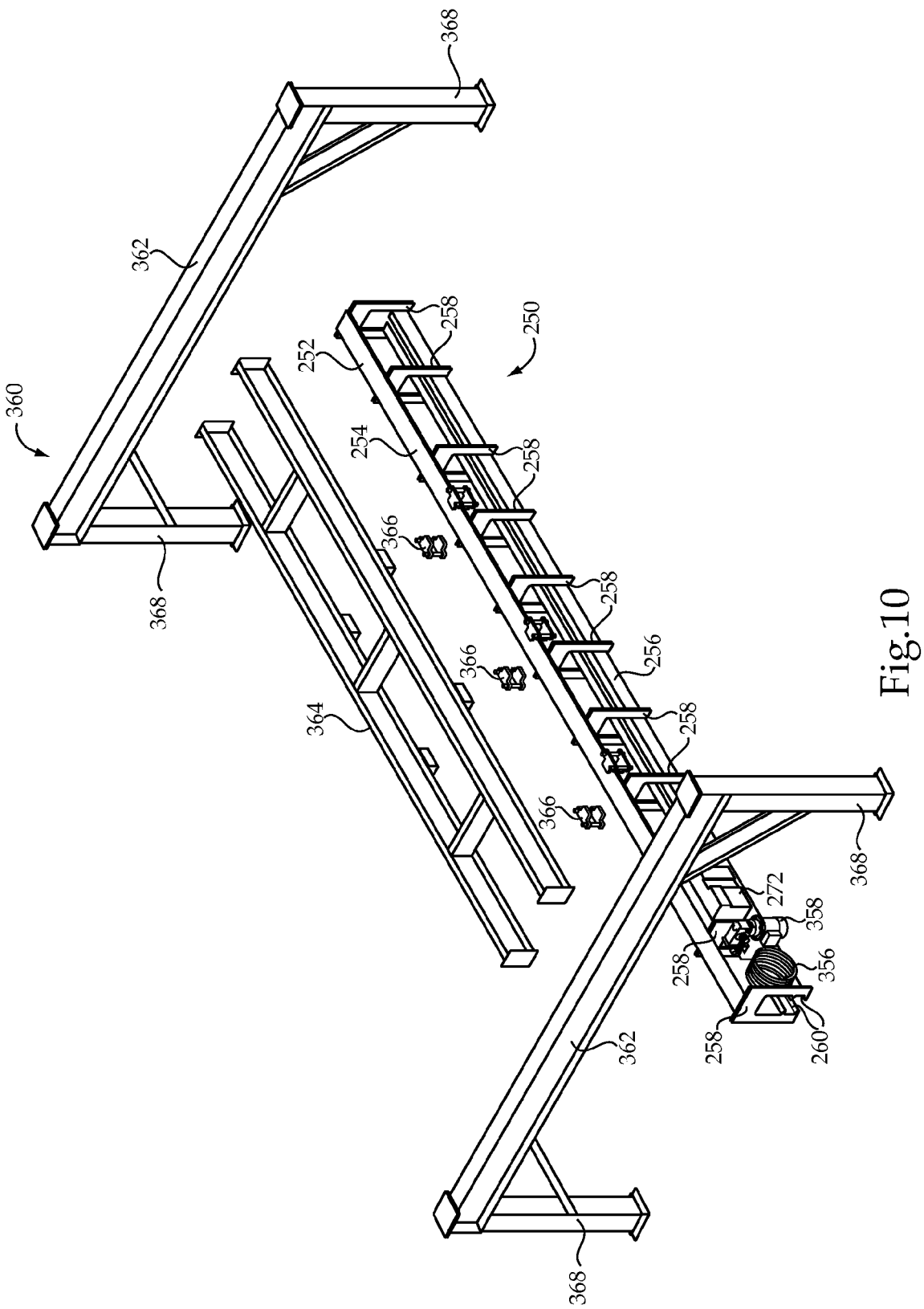
FIG. 10 is a partially exploded view of a manufacturing module including the modular material handling system of FIG. 8, according to the present disclosure.

The one or more composite beams 252 of the material handling system 250 may be provided in any desired length, and may include one or more straight and/or curved sections. According to one embodiment, the composite beams 252, which may be made from iron, steel, aluminum, plastics, composites, and/or any other desired materials, may be provided in specific lengths selected to ease assembly of the modular manufacturing chain 10 of FIG. 1. Specifically, the composite beams 252 may be pre-fabricated, or pre-constructed, prior to delivery to the manufacturing area 12 (FIG. 1). Further, each composite beam 252 may be shipped with a predetermined length of cable 356, an electric drive motor 272, and a variable-frequency drive 358 for operating the electric drive motor 272, each of which may be later repositioned. As shown in FIG. 10, each composite beam 252 may, according to the exemplary embodiment, be provided in a length corresponding to a length of a manufacturing module 360. The manufacturing module 360, which may be similar to the manufacturing module 32 described above, may include, according to one embodiment, a pair of end frames 362 connected through one or more central beams that define a midframe 364. One or more composite beams 252 may be supported from the manufacturing module 32 by attaching, such as by bolting, a plurality of connecting clamps 366 to the composite beam 252 and one or more of the mid-frame 364 and the end frames 362. Once at least one composite beam 252 is attached to the mid-frame 364 and/or end frames 362, according to the exemplary embodiment, the end frames 362 may be secured to floor supported beams (not shown). Specifically, end posts 368 may telescopically receive, or may be otherwise attached to, corresponding floor mounted beams (not shown) to form the manufacturing module 360. Alternatively, rather than end posts 368, the end frames 362 may include floor mounted support structures having an inverted "V-shape" oriented parallel to the composite beam 252.

According to yet alternative embodiments, the one or more composite beams 252 may be supported directly by the building 14, such as through cables suspended from a ceiling of the building 14. According to one example, the material handling system 250 may include a combination of ceiling or structure supported composite beams 252 and floor supported composite beams 252. The ceiling supported composite beams 252, as should be appreciated, may provide additional clearance for accommodating equipment, such as manufacturing equipment. Yet alternatively, the one or more composite beams 252 may be inverted to provide an on-floor conveyor, rather than the overhead conveyor that has been described. As should be appreciated by those skilled in the art, such an on-floor conveyor may represent an inverted version of the material handling system 250 described herein, with articles and respective carriers positioned, or supported, above the composite beams 252.

As described above, a plurality of manufacturing modules 360 may be positioned, such as in series, to define one or more paths through the modular manufacturing chain 10 of FIG. 1. The modular material handling system 250, including one or more composite beams 252 and the friction drive system 270, described above, may be supported along the one or more paths defined by the manufacturing modules 360. When supporting the material handling system 250, it is important to note that the composite beams 252 and friction drive system 270 must be aligned to provide continuous paths, as necessary. It should be appreciated that the friction drive system 270, as referenced herein, may comprise a plurality of friction drive modules, each of which includes one of the plurality of drive tubes 268 and a corresponding electric drive motor 272. Therefore, friction drive system 270, as used herein, may refer generally to the drive system, or material handling system 250, used throughout the entire modular manufacturing chain 10 (FIG. 1), or to a specific one or more of the modules, or segments, of the friction drive system 270.

Figures 11A, 11B:
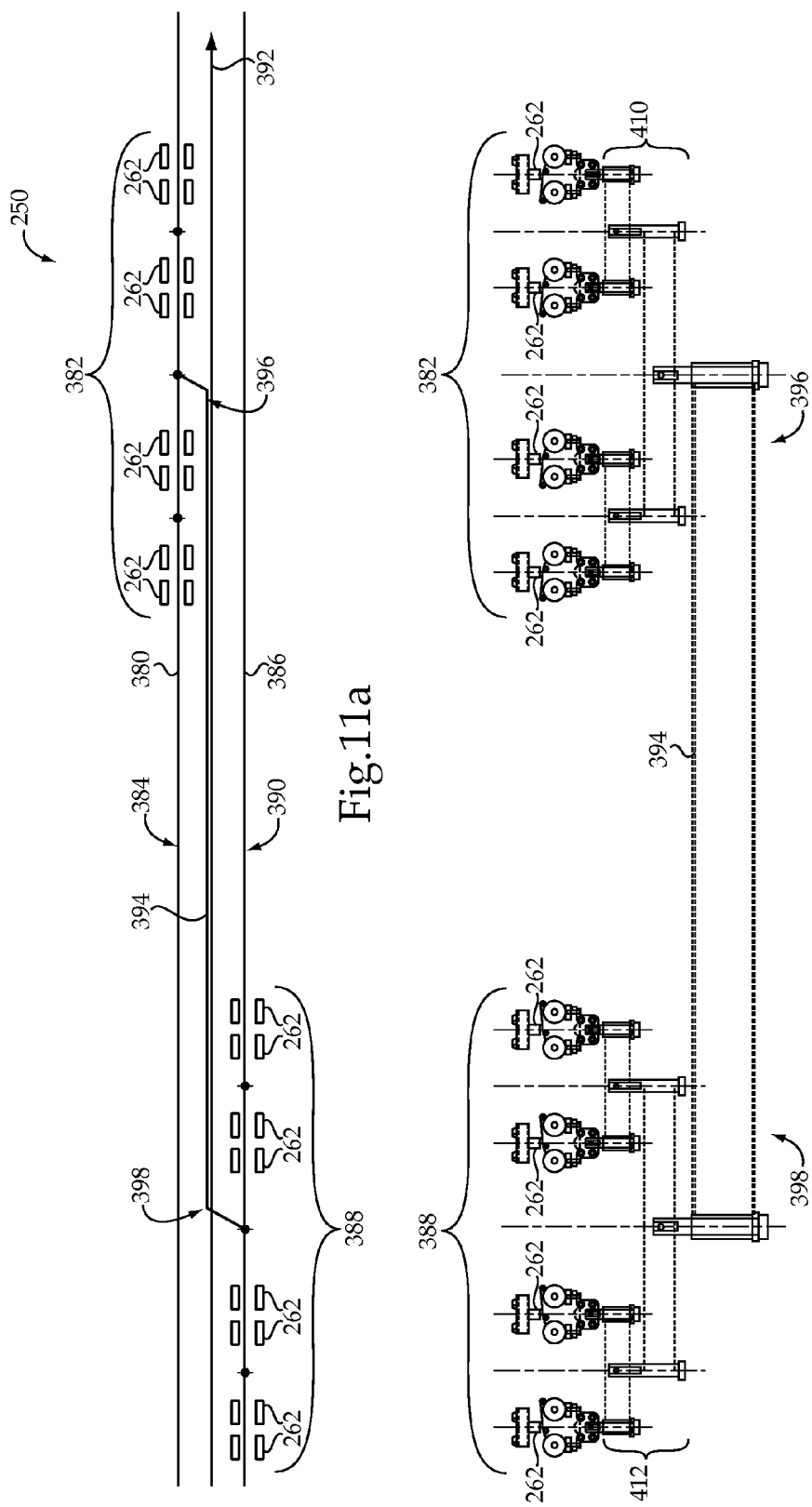
FIG. 11a is plan view of a modular material handling system including a dual track assembly, according to the present disclosure.
FIG. 11b is a side diagrammatic view of a trolley assembly configured to support a carrier along the dual track assembly of FIG. 11a, according to the present disclosure.

According to one implementation of the material handling system 250, shown in FIG. 11a, one or more manufacturing modules 360 of a manufacturing line, such as the manufacturing chain 10 of FIG. 1, may include a dual track, or multiple track, assembly. Specifically, as shown in the simplified plan view of FIG. 11a, the material handling system 250 may include a first track assembly 380 configured to transport a forward trolley assembly 382, including one or more trolleys 262, along a first path 384, and a second track assembly 386 configured to transport a trailing trolley assembly 388, including one or more trolleys 262, along a second path 390. Each track assembly 380 and 386 may include one or more composite beams 252 and a friction drive system 270, as described above. The composite beams 252 of the first and second track assemblies 380 and 386 may be positioned, and/or secured, adjacent one another, without substantial modification, and, as such, may define paths 384 and 390 through one or more modules 360 that are substantially parallel. Together, the parallel paths 384 and 390 may define a transportation path 392 along which the forward trolley assembly 382 and the trailing trolley assembly 388 are spaced.

A carrier 394, configured to support an article, may have a first end 396 pivotably supported by the forward trolley assembly 382 and a second end 398 pivotably supported by the trailing trolley assembly 388. According to a specific arrangement, shown in FIG. 11b, the first end 396 of the carrier 394 may be supported by the forward trolley assembly 382 through a first load bar assembly 410, while the second end 398 of the carrier 394 may be supported by the trailing trolley assembly 388 through a second load bar assembly 412.

Such a multiple track assembly, including two or more track assemblies, may be used to support articles of a substantial weight, such as, according to some embodiments, up to about 80,000 pounds. According to such arrangements, it may be desirable for the modular material handling system 250 to include at least the first track assembly 380 and the second track assembly 386 throughout the entire manufacturing chain 10, or line. However, it may be desirable to provide the multiple track assembly in only one or more modules of the manufacturing chain 10, as will be described below. It should be appreciated that, in such multiple track arrangements, it may be desirable to utilize the friction drive system 270 described herein, which inherently allows slippage, to successfully navigate any curves along the transportation path 392. Specifically, for example, one of the forward trolley assembly 382 and the trailing trolley assembly 388 may travel a greater distance than the other around such curves.

Figure 12:
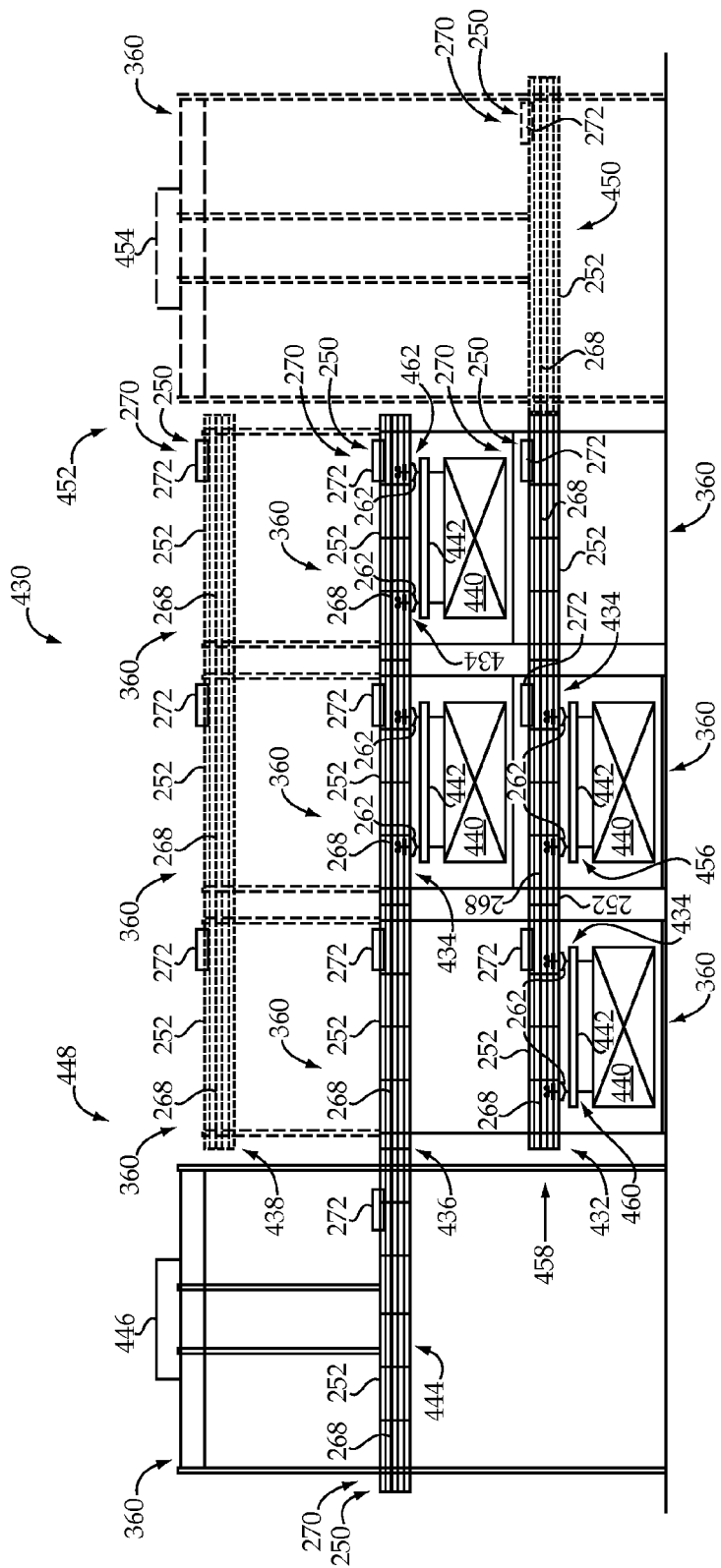
FIG. 12 is a side diagrammatic view of a buffer, according to the present disclosure.

According to another implementation, the manufacturing chain 10 may include one or more buffers, such as a buffer 430, as shown in FIG. 12. Specifically, the buffer 430, which may also be referred to as a sequencing buffer, may include a first track assembly 432 sized to receive at least two trolley assemblies 434, and a second track assembly 436 that is also sized to receive and support at least two trolley assemblies 434. According to some implementations, it may be desirable to provide a third track assembly 438, similar to the first track assembly 432 and the second track assembly 436, or any number of additional track assemblies. Each of the first, second, and third track assemblies 432, 436, and 438 may be vertically spaced, as shown, or may be otherwise positioned, as described below.

Each of the track assemblies 432, 436, and 438 may include any number of manufacturing modules 360 positioned such that the material handling system 250 of each track assembly 432, 436, and 438, including one or more composite beams 252 and a friction drive system 270, defines a continuous path along the respective track assembly 432, 436, or 438. According to one embodiment, each module 360 may include one drive tube 268 and a corresponding electric drive motor 272 for transporting the trolley assemblies 434 along the first, second, and third track assemblies 432, 436, and 438 in a forward or reverse direction. As shown, each trolley assembly 434 may include a pair of trolleys 262 configured to support an article 440 using a carrier 442. It should be appreciated, however, that any number of trolleys 262 may be configured to directly or indirectly support the carrier 442.

The buffer 430, illustrated as a stackable buffer, may also include a first movable track assembly 444 that may include the material handling system 250 described above. The first movable track assembly 444 may be supported by a manufacturing module 360 and may be movable between a plurality of positions. For example, the first movable track assembly 444 may have a first position that defines a continuous path along the first movable track assembly 444 and the first track assembly 432. A "continuous path," as used herein, may reference any path along which a trolley 262 may be continuously transported. The first movable track assembly 444 may also include a second position (shown) defining a continuous path along the first movable track assembly 444 and the second track assembly 436. Further, for embodiments having a third track assembly 438, the first movable track assembly 444 may have a third position defining a third continuous path along the first movable track assembly 444 and the third track assembly 438.

A first programmable hoist 446, or other similar transfer device, may be configured to move the first movable track assembly 444 between the first, second, and third positions described above. The first programmable hoist 446 may be of conventional design and, further, may be integrated with the control system 220, described above. The first movable track assembly 444 may be positioned at a first end 448 of the buffer 430, or at any other desired position along the buffer 430. Further, the buffer 430, according to the exemplary embodiment, may include a second movable track assembly 450 positioned at a second end 452 of the buffer 430. The second movable track assembly 450, similar to the first movable track assembly 444, may be movable using a second programmable hoist 454, or other similar transfer device. Specifically, the second movable track assembly 450 may be movable between a first position (shown) defining a continuous path along the second movable track assembly 450 and the first track assembly 432, a second position defining a continuous path along the second movable track assembly 450 and the second track assembly 436, and a third position defining a continuous path along the second movable track assembly 450 and the third track assembly 438.

It should be appreciated that the track assemblies 432, 436, and 438 of the buffer 430 may, according to one alternative embodiment, be horizontally spaced, rather than vertically spaced. According to such implementations, the buffer 430 may utilize one or more lateral shuttles, described below, rather than programmable hoists 446 and 454, to move the movable track assemblies 444 and 450 into alignment with one of the first, second, and third track assemblies 432, 436, and 438. Such design choices, for example, may be based on spatial constraints of the manufacturing area 12 (FIG. 1) and/or specific needs of the manufacturing processes that are supported. As such, the buffer 430 may include any number of stationary track assemblies, such as track assemblies 432, 436, and 438, having any desired capacity, positioned and/or stacked according to a customized configuration. Further, the buffer 430 may include any number of movable track assemblies, such as movable track assemblies 444 ad 450, positioned at any useful positions throughout the buffer 430. Such a customized buffer 430 may be used to transport, store, sequence, and/or re-sequence carriers 442 and/or articles 440 supported thereon, as described below in greater detail.

During an exemplary operation, one or more of the trolley assemblies 434 may be distributed among the first track assembly 432 and the second track assembly 436 of the buffer 430 such that a first trolley assembly 456 is blocked from an exit position 458. The exit position 458 may represent a position within the buffer 430 from which a trolley assembly 434 may be removed from the buffer 430 without having to move another trolley assembly 434. For example, the exit position 458 may include a position that accommodates a continuous path onto a main path of a manufacturing line. To move the first trolley assembly 456 to the exit position 458, the plurality of trolley assemblies 434 may be redistributed among the first track assembly 432 and the second track assembly 436. For example, a second trolley assembly 460, currently at the exit position 458 and blocking the first trolley assembly 456 from the exit position 458, may be moved along the first track assembly 432 using the friction drive system 270 and onto the first movable track assembly 444. The first movable track assembly 444 may then be raised, using the first programmable hoist 446, from the first position to the second position (shown). At the second position of the first movable track assembly 444, the second trolley assembly 460 may be moved from the first movable track assembly 444 and onto the second track assembly 436, using the friction drive system 270. As a result, the first trolley assembly 456 may be moved along the first track assembly 432 and into the exit position 458.

It should be appreciated that, in the exemplary operation described above, the second track assembly 436 was not at its illustrated capacity of three trolley assemblies 434 and, therefore, the second trolley assembly 460 could more easily be moved onto the second track assembly 436. However, if the second track assembly 436 were supporting a maximum number of trolley assemblies 434, it may be necessary to move one of the trolley assemblies 434 from the second track assembly 436 to the first track assembly 432. For example, the second movable track assembly 450 may be moved from the first position (shown) to the second position, described above. Next, a third trolley assembly 462 may be moved along the second track assembly 436 and onto the second movable track assembly 450. The second movable track assembly 450 may then be lowered, such as by using the second programmable hoist 454, from the second position to the first position, such that the third trolley assembly 462 may be moved from the second movable track assembly 450 and onto the first track assembly 432.

It should also be appreciated that, if both the first track assembly 432 and the second track assembly 436 are at maximum capacity, trolley assemblies 434 may be simultaneously moved, or shifted, through the buffer 430. For example, the friction drive system 270 of the first track assembly 432 may transport the trolley assemblies 434 in a first direction, while the friction drive system 270 of the second track assembly 436 may transport the trolley assemblies 434 in a second direction that is opposite the first direction. Specifically, the trolley assemblies 434 may be shifted in clockwise direction or a counterclockwise direction through the buffer 430 to move a desired trolley assembly 434 to the exit position 458. As should be appreciated, to provide such re-sequencing when the buffer 430 is at, or near, maximum capacity, it may be preferable to utilize at least two or more movable track assemblies, such as movable track assemblies 444 and 450. Further, it should be appreciated that the friction drive system 270 or, more specifically, friction drive modules corresponding to each of the track assemblies 432, 436, and 438 and movable track assemblies 444 and 450 may provide independent movement and control of each of the trolley assemblies 434 positioned therein.

Figure 13:
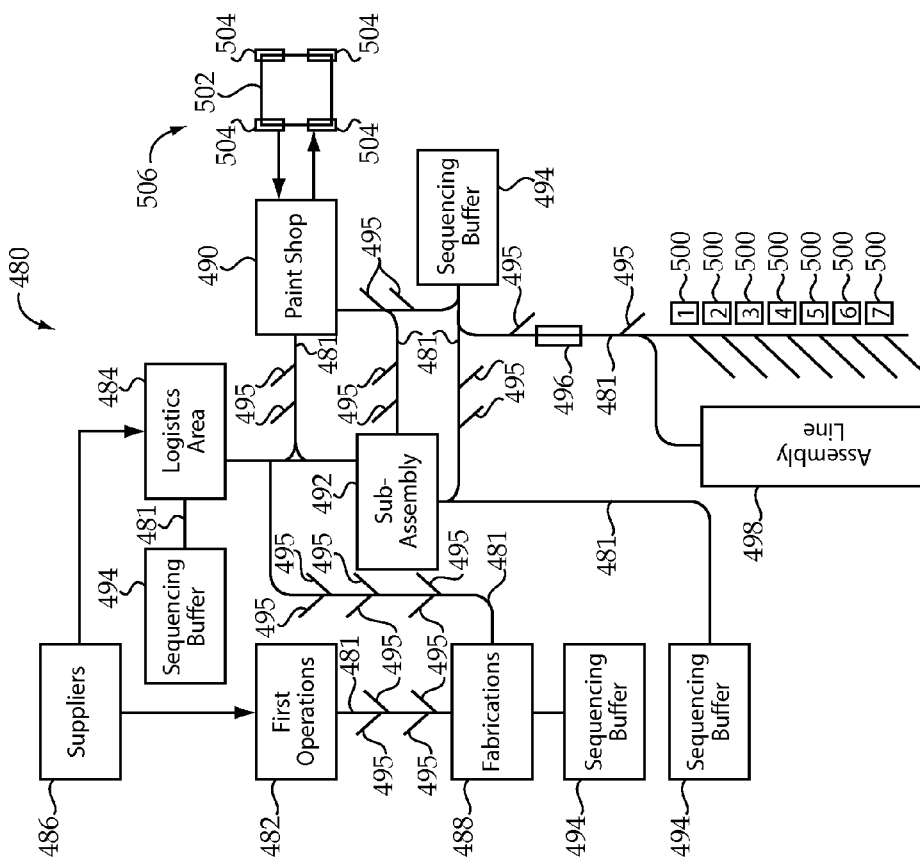
FIG. 13 is a block diagram of a first line, according to the present disclosure.

Turning now to FIG. 13, a high level view of a first line 480 is shown. The first line 480 may be similar to, or may include, the modular manufacturing chain 10 described above with reference to FIG. 1. Specifically, the first line 480 may include a plurality of stationary modules, such as modules 32 (FIGS. 1-5) or modules 360 (FIG. 10), positioned in series, or in parallel, and defining at least one path 481, which may include a main path, through the first line 480. The first line 480 may utilize the material handling system 250, as described above, including one or more composite beams 252 supporting the friction drive system 270. Generally, according to one example, the first line 480 may include first operations 482 and a logistics area 484, both of which may receive articles, such as parts, from suppliers 486. From first operations 482, parts, or other articles, may be transported to fabrications 488, using the material handling system 250, by supporting the parts using carriers, as described above. From both logistics 484 and fabrications 488, articles may be transported to paint shop 490 or sub-assembly 492.

As shown, the first line 480 may include a plurality of buffers 494, which may be similar to the buffer 430 described above with reference to FIG. 12. The buffers 494 may be positioned anywhere along the first line 480, such that carriers, and articles supported thereon, may be routed off the one or more main paths 481 and into the buffers 494. As described above, the buffers 494 may be used to store and/or re-sequence carriers and/or articles. A plurality of spurs 495 may also be provided throughout the first line 480 for storing and/or re-sequencing carriers, in a manner described in greater detail below. Further, the articles may remain on the same carriers continuously throughout the first line 480, which may span one or more buildings or manufacturing areas. For example, parts and/or sub-assemblies may be stored in one of the buffers 494, or other storage areas, until they are transported, such as by using a trolley assembly 496, similar to those described above, to an assembly line 498 or to one or more stations 500 along the assembly line 498. The articles and/or carriers may be tracked, such as by using barcodes, sensors, and the control system 220 described above, to access and route the parts to the assembly line 498 and/or stations 500 precisely when they are needed.

Figure 14:
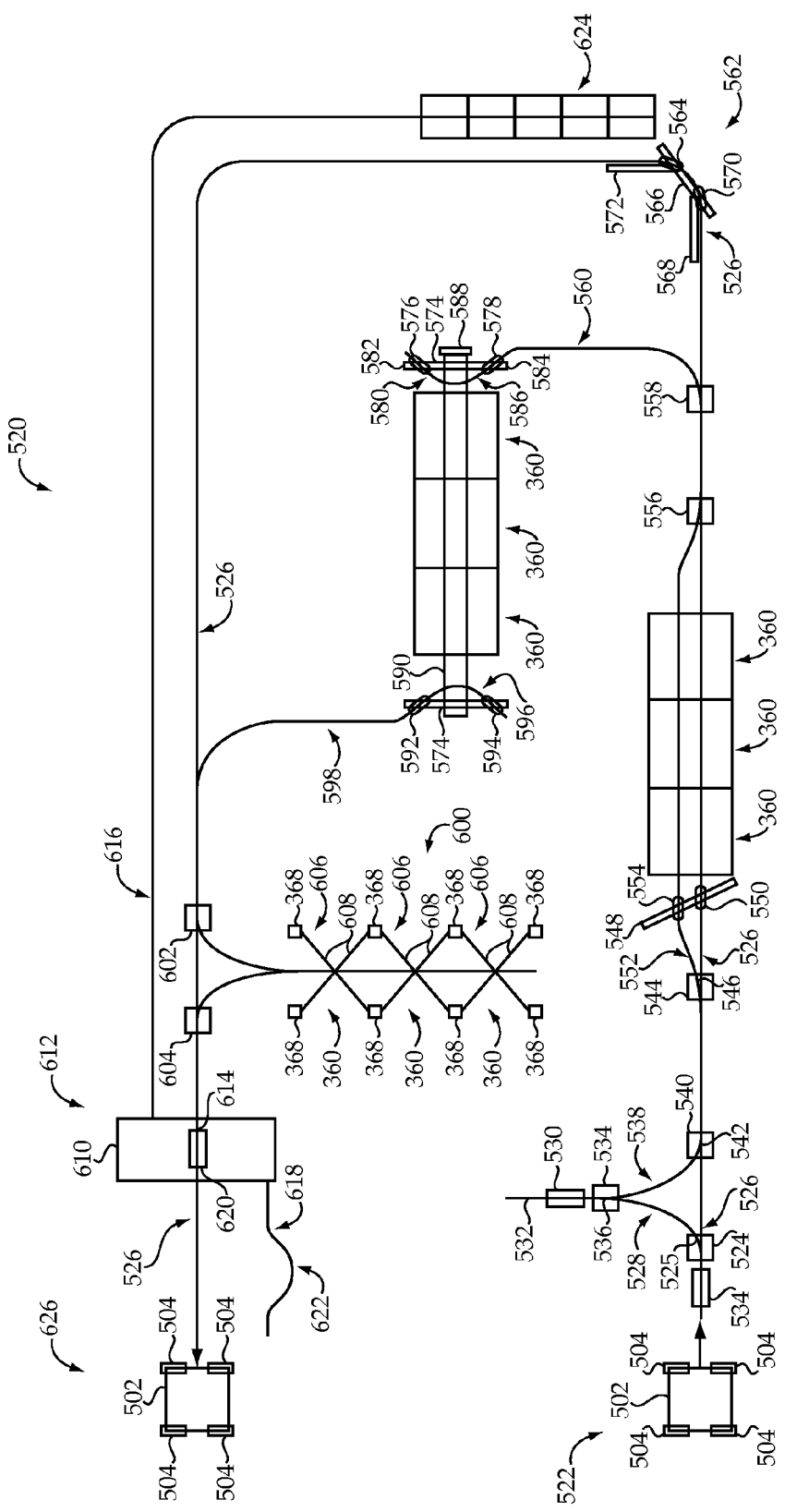
FIG. 14 is a plan view of a second line, according to the present disclosure.

A mobile module 502, having ground-engaging elements 504, may be used to transport an article, such as a part, sub-assembly, or assembly, from the first line 480 to a second line 520, as shown in FIG. 14. Specifically, the mobile module 502 may be movable between, at least, a first position 506, as shown in FIG. 13, to a second position 522, as shown in FIG. 14. The mobile module 502 may include one or more modules, such as modules 32 (FIG. 1-5) or 360 (FIG. 10) supported by a frame, such as an enclosed portion of a vehicle or other mobile device. For example, the mobile module 502 may represent a mobile version of one of the stationary modules 32 or 360 described above, and may be movable using any known transportation means. The mobile module 502 may also include a material handling system 250, including one or more composite beams 252 supporting a friction drive system 270, as described above. It should be appreciated that in both the first position 506 and the second position 522, the material handling system 250 of the mobile module 502 may be aligned with a portion of the material handling system 250 of the respective line 480 or 520, such that a trolley assembly, such as trolley assembly 492, may be continuously transported along the respective material handling systems 250. According to another embodiment, the material handling system 250 may provide a continuous path between adjacent buildings. Further, an enclosure may be provided to protect the material handling system 250 and any articles transported thereon from the weather, and other adverse conditions, to which they may be exposed between buildings. As should also be appreciated, transporting an article on its respective carrier may allow the carrier and, thus, article to be tracked while it is transported between remote buildings, locations, etc., as described herein.

Referring also to FIGS. 1-13, the second line 520 of FIG. 14 may also include a plurality of stationary modules 32 or 360 positioned in series and defining at least one path through the second line 520. The second line 520 may utilize the material handling system 250, as described above, including one or more composite beams 252 supporting a friction drive system 270. Generally, the second line 520 may include one or more track switches, which may each be positioned between two of the plurality of drive tubes 268. According to one example, a first track switch 524, which may include a movable track assembly 525, may be movable between a first position defining a first path 526, and a second position defining a second path 528. As shown, the second path 528 may be positioned at an angle that is greater than zero with respect to the first path 526. By moving the first track switch 524 from the first position to the second position, a carrier, such as carrier 530, may be transported through the first track switch 524 and onto a spur 532 (as shown). It should be appreciated that the spur 532, and additional spurs, may be positioned along the second line 520 and used for temporary storage and/or carrier re-sequencing. For example, the carrier 530 may be routed onto the spur 532, the first track switch 524 may be moved back to the first position, and one or more additional carriers, such as carrier 534, may proceed along the first path 526 in advance of carrier 530.

The spur 532 may also provide a means for turning carriers around. For example, the carrier 530 may be transported, such as in a forward direction, along the second path 528 and past a second track switch 534. The second track switch 534 may also include a movable track assembly 536 that is movable between a first position defining the second path 528 and a second position defining a third path 538. After the carrier 532 is moved along the second path 528 and past the second track switch 534, the second track switch 534 may be moved to the second position, such that the carrier 532 may be moved, in a reverse direction, along the third path 538. Further, a third track switch 540, also including a movable track assembly 542, may be movable between a first position defining the first path 526 and a second position defining the third path 538. Thus, when the third track assembly 540 is in the second position, the carrier 532 may be transported from the spur 532, in the reverse direction, and back along the first path 526, with the article supported by carrier 530 having an orientation that is 180° opposite its previous orientation.

Additional means for turning around a carrier, such as the carrier 530, may include movement of a track assembly using a known gantry track, or crane. Specifically, for example, a gantry track, which may provide a fixed structure about which the track assembly may be pivoted, may be used alone or in combination with one or more track switches to reposition a track assembly with respect to a main path, such as the first path 526. Due to the modularity of the material handling system 250, gantry tracks, which may be traveling, portable, or fixed, may also be used to move a carrier, such as carrier 530, between one or more alternative paths, thus operating as a shuttle. Such a shuttle, as should be appreciated, may be used to align a movable track assembly with one of a plurality of track assemblies, thus providing alternative paths for the carrier 530.

Track switches, as described above, may be incorporated along the second line 520 for additional purposes. For example, a track switch, such as a fourth track switch 544 having a movable track assembly 546, may be used to transition a carrier, such as carrier 548, onto a dual track assembly, which may be similar to the dual track assembly described above with reference to FIGS. 11a and 11b. For example, a first trolley assembly 550, supporting the carrier 548 may be transported through the fourth track switch 544 and along the first path 526, while the fourth track switch 544 is in a first position. The fourth track switch 544 may then be moved into a second position, which defines a fourth path 552. As such, a second trolley assembly 554 may be transported along the fourth path 552, which may be substantially parallel to the first path 526. It should be appreciated that movement of the first trolley assembly 550 and the second trolley assembly 554 may be controlled to position the carrier 548, and the one or more articles supported thereon, at any desired angle with respect to the direction of travel. As should be appreciated, there may be one or more modules 360 through which it may be desirable to transport articles at alternative angles, such as, for example, paint or wash modules. Further, it should be appreciated that such diagonal orientation of the carrier 548 may be useful when storing a plurality of carriers, similar to carrier 548, along a spur, such as spur 532, or within a buffer, such as buffer 430. Specifically, a substantial amount of space may be saved by accumulating carriers, such as carrier 548, at diagonal orientations relative to the direction of travel by providing the dual paths 526 and 552 and track switch 544, as described above.

After transporting the carrier 548 through one or more modules 360 at an alternative angle with respect to the direction of travel, a fifth track switch 556 may be positioned along the second line 520 to return the second trolley assembly 554 to the first path 526. Track switches, such as a sixth track switch 558, may also be used to route carriers through one or more alternative paths through the second line 520. For example, the sixth track switch 558 may be used to route carriers along either of the first path 526 and a fifth path 560. As shown, the first path 526 may include one or more curves, such as curves 562 and 564. To navigate around such curves, according to one embodiment, a first trolley assembly 564 of a carrier 566 may be disengaged from a first drive tube 568, while a second trolley assembly 570 of the carrier 566 may be engaged with the first drive tube 568. As such, the first trolley assembly 564 may be pushed around the curve 562 using the second trolley assembly 570. As the carrier 566 travels through the curve 562, the first trolley assembly 564 may engage a second drive tube 572. The second trolley assembly 570 may eventually disengage from the first drive tube 568, thus allowing the first trolley assembly 564 to pull the second trolley assembly 570 around the curve 562. Specifically, for example, such curves 562 may be navigated by positioning drive tubes 568 and 572, such as linear drive tubes, such that at least one trolley assembly 564 or 570 continuously engages one of the drive tubes 568 and 572.

If a carrier, such as a carrier 574, is transported along the fifth path 560, a first trolley assembly 576 and a second trolley assembly 578 may ultimately transition the carrier 574 around a curve 580. When the carrier 574 is positioned along the curve 580, and the first trolley assembly 576 and the second trolley assembly 578 are stopped, ends 582 and 584 of the carrier 574 may extend beyond a perimeter 586 defined by the curve 580. When positioned as shown, the carrier 574 may be removed from the fifth path 560 using a programmable hoist 588. The programmable hoist 588, which may be of conventional design, may include one or more track assemblies 590 along which the programmable hoist 588 may be movable. Specifically, the programmable hoist 588 may move the carrier 574, and the article supported thereon, through one or more modules 360, lowering and raising the carrier 574, as necessary. The programmable hoist 588, according to one embodiment, may be supported on its own carrier, which may be supported by one or more trolleys that are movable along track assemblies 590, as described herein. More specifically, the carrier and trolleys supporting the programmable hoist 588 may operate as a bridge crane moving along the track assemblies 590, which may serve as runways for the bridge crane. Further, a track assembly, such as track assemblies 590 including one or more composite beams 252, may be used as the bridge between the runways. Yet further, one of the track assemblies described herein may be configured as a gantry crane, in which one end of the track assembly is pivotable about the other.

After the carrier 574 is transported through one or more modules 360 using the track assemblies 590 and programmable hoist 588, the carrier 574, and article supported thereon, may again be supported on one or more trolley assemblies. Specifically, the carrier 574 may be supported by a first trolley assembly 592 and a second trolley assembly 594, when the first trolley assembly 592 and the second trolley assembly 594 are positioned around a curve 596 of a sixth path 598. The sixth path 598 may be positioned to route the carrier back to the first path 526, as shown. It should be appreciated that the article may remain on the same carrier 574 throughout the transition of the carrier 574 to and from the programmable hoist 588. It should also be appreciated that this transition, and others described herein, are intended as examples only and, therefore, should not limit the second line 520, or material handling system 250 thereof, in any way.

An additional spur 600 may be positioned along the second line 520 to store and/or re-sequence carriers, as described above. Specifically, a seventh track switch 602 and an eighth track switch 604 may be movable to route one or more carriers into and out of the spur 600. As shown, one or more modules 360 positioned along the spur 600, and/or other modules, may include a zigzag support frame 606. Specifically, as an alternative to the end frames 362 and mid-frame 364 of FIG. 10, one or more modules 360 may include beams 608, or headers, that are oriented at an angle, or cross-oriented, with respect to a travel direction through the module 360. The beams 608 may be attached to end posts 368, as shown, and may support one or more composite beams 252, as described above. Although the modules 360 are shown as including two cross-oriented beams 608, it should be appreciated that each module 360 may include only one beam having an angled orientation with respect to the direction of travel. For example, consecutive modules 360 may include headers, or beams, that are oriented at alternative angles, but that define a continuous zigzag support structure through the modules 360. Such arrangements, as should be appreciated, may require fewer beams and, therefore, less material for construction of modules 360. Further, in addition to reduced material cost, such arrangements, utilizing fewer beams, may require less time for assembly of the modules 360.

A shuttle, such as a lateral shuttle 610, may be positioned at an end 612 of the second line 520, as shown. According to one embodiment, the lateral shuttle 610 may include one or more trolley assemblies, such as any of the trolley assemblies described herein, that are movable along one or more track assemblies, also described herein. The trolley assemblies may support an additional track assembly 614, oriented perpendicular to the track assemblies along which the trolley assemblies are moved, which is movable to define alternative paths. According to the exemplary embodiment, for example, the track assembly 614 may include a position defining a seventh path 616, a position defining a continuous path along the first path 526 (shown), and a position defining an eighth path 618. However, as should be appreciated, such a shuttle 610 may be movable to define any number of alternative paths for one or more carriers, such as a carrier 620, positioned thereon.

According to the illustrated embodiment, the track assembly 614 may be moved, such as by using the shuttle 610, to align with the eighth path 618 of the second line 520. When the track assembly 614 is positioned to define a continuous path, the carrier 620, and article supported thereon, may be moved onto the eighth path 618. As shown, the eighth path 618 may also include a curve 622, from which the article may be removed from the second line 520. According to one example, the article may be removed from the second line 520 only for delivery to a customer. Alternatively, however, the article may be transported to a customer using the mobile module 502, as described herein. If the article is removed from the carrier 620, the empty carrier 620, according to one embodiment, may be returned to the track assembly 614. The shuttle 610 may then be used to move the track assembly 614 to align with the seventh path 616, which may route the empty carrier 620 to one or more desired locations, such as, for example, a storage buffer 624, which may be similar to the buffer 430 of FIG. 12. According to one example, the seventh path 616 may include one or more composite beams 252, described herein, which may be supported from one or more modules 360. Specifically, one or more modules 360 may support one or more composite beams 252 defining a first path through the modules 360, and one or more composite beams 252 defining an additional path adjacent the modules 360 for empty carrier returns.

It should be appreciated that alternative arrangements may be used for carrier, or empty carrier, returns. For example, a buffer, such as the buffer 430 described above, may be used to define a first, main, path and a second, return, path. One or more movable track assemblies, such as movable track assemblies 444 and 450 of FIG. 12, may be used to transition carriers from the main path to the return path, in a manner similar to that described above. Such transitions, also referred to as an over-under conveyance, may be incorporated, as needed, into the first line 480 and/or the second line 520. For example, one of the stationary track assemblies of the buffer 430 of FIG. 12 may be positioned along a main path, such as the main path 481 of the first line 480 or the first path 526 of the second line 520. Alternatively, one or more carriers may be routed off the main path 481 or first path 526 and into the buffer 430, such as by actuating one or more track switches, as described herein.

The carrier 620 may, alternatively, be routed through the shuttle 610 along the first path 526 and, for example, onto a mobile module, such as the mobile module 502. In a third position 626 (shown) of the mobile module 502, the material handling system, such as material handling system 250 described herein, of the mobile module 502 may be aligned with the material handling system 250 of the second line 520 such that the carrier 620 may be continuously transported from the first path 526 and onto the mobile module 502. From there, the mobile module 502 may return the carrier 620, and article supported thereon, to the first line 480. It should be appreciated that the first line 480 and the second line 520 may represent one or more manufacturing lines positioned in adjacent buildings or, alternatively, at remote locations.

The modular material handling system 250, as described herein with reference to the preceding figures, may be used as a common material handling system throughout an entire manufacturing, or production, process. For example, the material handling system 250 may be used throughout the first line 480 (FIG. 13), the second line 520 (FIG. 14), and any number of mobile modules 502 that may be configured to transport articles between the first line 480 and the second line 520. Specifically, the same material handling system 250 may be used to route an article through all of the implemented manufacturing processes, including, for example, first operations 482, logistics 484, fabrications 488, paint 490, sub-assembly 492, and assembly 498 of the first line 480. Although specific examples are provided, it should be appreciated that the modular material handling system 250, as described herein, may be used to support any number and/or combination of manufacturing processes.

Further, the configuration of the material handling system 250, including composite beams 252 and friction drive system 270, as shown in FIG. 8, may provide a modular material handling system that may be relatively quickly and easily assembled and/or modified. Specifically, as described with reference to FIG. 10, each of a plurality of manufacturing modules 360 may be assembled by connecting a mid-frame 364 to a pair of end frames 362, and supporting a pre-constructed composite beam 252 from the interconnected frames using one or more connecting clamps 366. The friction drive system 270, and other systems or controls, may be supported from the module 360 and, further, may be connected to any necessary utilities via a utility transfer module 40, as described above. Further, an Andon system, as is known in the art, may be integrated with the any of manufacturing lines 10, 480, and 520 and, further, with the control system 220. For example, a visual indication of a problem identified, either manually or automatically, at a specific module 32 or 360 may be provided. It should be appreciated that the systems, controls, and equipment used herein may all be provided with plug and play functionality to further ease assembly and/or modification of the manufacturing modules 360.

The composite beams 252, embodiments of which are illustrated in FIGS. 9a-9c, and friction drive system 270 of material handling system 250 may support a wide range of weights. Specifically, for example, the composite beams 252 may support any of a variety of articles, ranging from small parts to large sub-assemblies, using one or more trolleys 262 of the friction drive system 270, which may be configured to directly or indirectly support articles. By supporting such a wide range of weights, the material handling system 250 may be used in a variety of industries, and throughout processes that normally integrate multiple material handling systems or devices, including forklifts, to transport both small and large articles. According to one example, the material handling system 250, as described herein, may be used to transport both large sub-assemblies and small parts along the main path 481 of the first line 480 (FIG. 13). Specifically, for example, a large sub-assembly may be transported from sub-assembly 492 to the assembly line 498 along path 481, while a plurality of small parts may be transported from one of the buffers 494 to stations 500 along the same path 481. Alternatively, either or both of the first line 480 and the second line 520 may integrate a material handling system 250 sized to support lighter weights with a material handling system 250 sized to support heavier weights. Further, such embodiments may incorporate weigh stations along the material handling systems 250 to ensure that trolleys 262 are not routed along paths incapable of providing sufficient support. Alternatively, a control system, such as the control system 220 described above, may track the weight of each article transported along the one or more integrated material handling systems 250 and route respective trolleys 262 accordingly.

To increase the versatility of the material handling system 250, a variety of devices and/or features, including, but not limited to track switches, spurs, buffers, programmable hoists, shuttles, and gantry tracks, examples of which are provided herein, may be integrated with the material handling system 250, as described above. As should be appreciated, these devices and/or features may be utilized by the material handling system 250 to provide numerous and useful transitions of articles throughout a manufacturing, or production, process. Further, the material handling system 250, and devices or features incorporated therein, may be integrated with a control system, such as the control system 220, to coordinate the processes for and movements of each article transported along the material handling system 250. Specifically, by tracking and controlling each article, flow throughout the manufacturing process can be better organized, thus reducing waste and improving efficiency.

Figure 15:
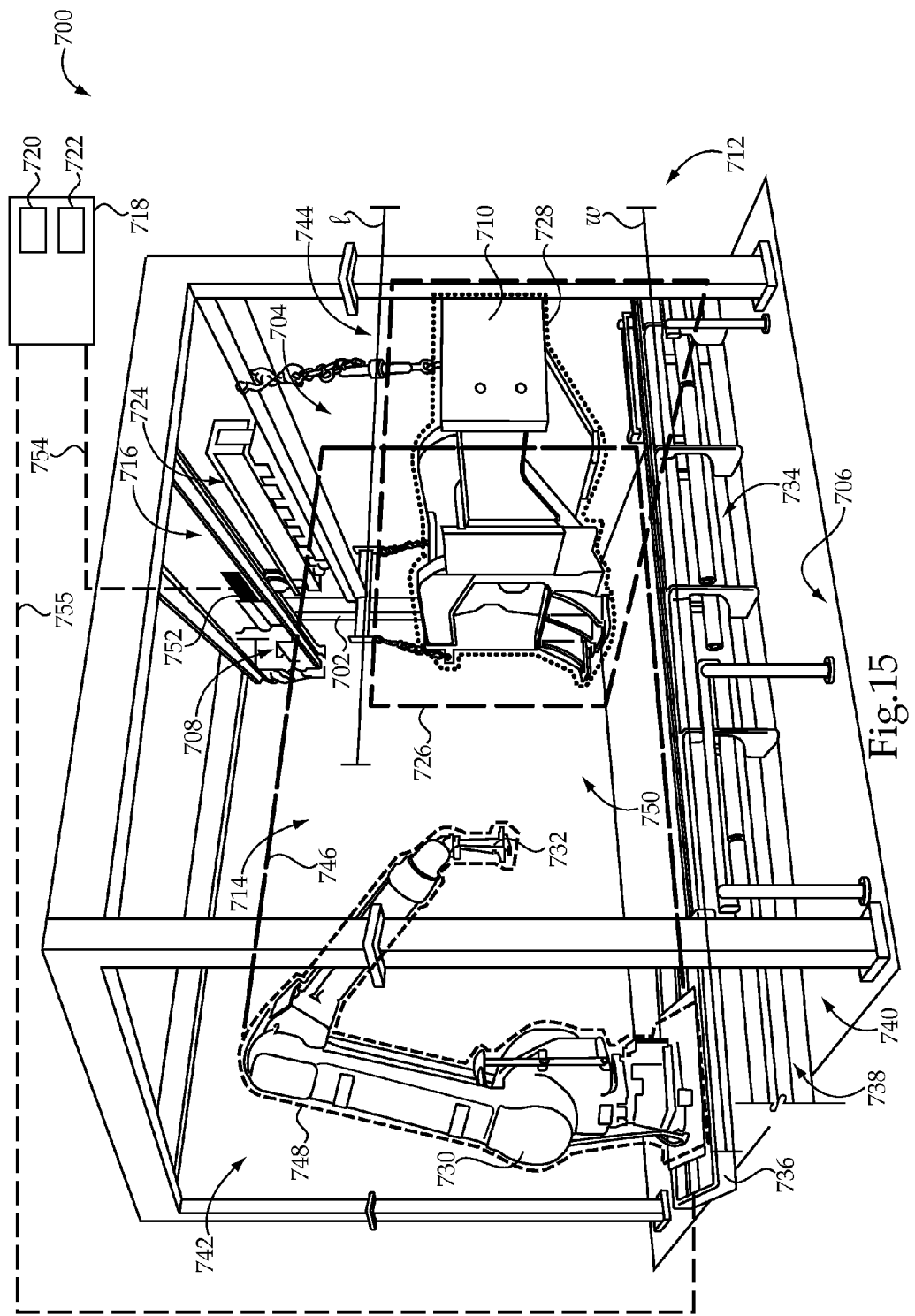
FIG. 15 is a perspective view of a modular manufacturing station including a work tool having a work tool support nozzle, depicting the work tool at a first work tool position and a suspended article at an operational position, according to another aspect of the present disclosure.

Turning now to FIG. 15, an exemplary modular manufacturing station 700 that may be operationally positioned within the manufacturing chain 10, or modular manufacturing line, is shown. For example, the modular manufacturing station 700 may be substituted for the paint application station 24, shown in FIG. 1, and may be operationally aligned with the inspection station 22 and the curing station 26. The modular manufacturing station 700 may include a framework 702, similar to the frameworks described above, defining a manufacturing space 704, as shown. For example, the manufacturing space 704 may include a volume defined, or bounded, by the framework 702 and a manufacturing floor 706. An overhead friction drive system 708, details of which are described above, may be supported on the framework 702 and configured to move a suspended article 710 through the manufacturing space 704, such as, for example, from an entrance 712 of the modular manufacturing station 700 to an exit 714 of the modular manufacturing station 700. As should be clear from the description above, the modular manufacturing station 700 and overhead friction drive system 708 may be operationally positioned relative to additional modular manufacturing stations to define a transportation path 716 through the manufacturing chain 10. Thus, the overhead friction drive system 708 depicted in FIG. 15 represents a portion, or segment, of the transportation path 716.

A control system 718 may be in control communication with the overhead friction drive system 708 to control movement of the suspended article 710 according to a unique operation pattern, as described above. For example, a plurality of unique operation patterns may be stored in a memory 720 of the control system 718. A processor 722 of the control system 718 may be configured to select a particular operation pattern from those stored in memory 720 that corresponds to the suspended article 710 and the operation being performed at the modular manufacturing station 700. According to a specific example, the suspended article 710 may be supported with a carrier 724, which may be configured to communicate identification information, such as a unique part number, corresponding to the suspended article 710 to the control system 718. The control system 718 may then be able to customize processing at the modular manufacturing station 700 based on the specifications of the suspended article 710. This unique processing may occur while the control system 718 is simultaneously controlling carrier movements and manufacturing equipment operation at another modular manufacturing station according to a different unique operation pattern.

The unique operation pattern, as described herein, may include forward and reverse movements along the transportation path 716. Ultimately, the suspended article 710 is moved from the entrance 712 of the modular manufacturing station 700 to the exit 714 of the modular manufacturing station 700 along a linear path substantially parallel with the overhead friction drive system 708. Thus, the suspended article 710 occupies an article pathway volume 726 during the controlled movements through the manufacturing space 704. The article pathway volume 726 corresponds to a three-dimensional footprint 728 of the suspended article 710 and a length l of the modular manufacturing station 700.

A work tool 730 is operationally positioned at the modular manufacturing station 700 and includes a work tool spray nozzle 732. For example, the work tool 73 may be a robotic arm, or other similar manufacturing equipment, configured to treat the surface a work piece, such as the suspended article 710, which may include a machine frame or portion thereof. The work tool 73 may be configured to control movements of the work tool spray nozzle 732 relative to the suspended article 710. The work tool spray nozzle 732 may direct a processing fluid, such as, for example, a paint, water, or cleaning fluid, toward the suspended article 710 for appropriate processing. For example, the work tool spray nozzle 732 may move according to a work tool program corresponding to the suspended article 710. According to a specific example, the carrier 724 may communicate the identification information mentioned above, which may include a part number, to the work tool 730, and the work tool 730 may select and utilize a work tool program corresponding to the identification information.

The work tool 730 is movable along a floor mounted work tool support track 734. For example, the work tool 730 may be supported on a support platform 736, which is supported on a carrier 738. The floor mounted work tool support track 734 may include also include a friction drive system 740. However, rather than an overhead friction drive system, the friction drive system 740 may include inverted components that are directly supported on the manufacturing floor 706. The friction drive system 740 may work similarly to, and may include the same components as, the overhead friction drive system 708. The work tool support track 734 is positioned such that the friction drive system 740 moves the carrier 738 and, thus, work tool 730, between a first side 742 of the modular manufacturing station 700 and a second side 744 of the modular manufacturing station 700. According to such movements, the work tool 730 occupies a work tool pathway volume 746 during movement through the manufacturing space 704. The work tool pathway volume 746 corresponds to a three-dimensional footprint 748 of the work tool 730 and a width w of the modular manufacturing station 700. As shown and for reasons described below, the article pathway volume 726 and the work tool pathway volume 746 intersect.

According to an exemplary operation, such as a paint operation, the suspended article 710 may be advanced to an operational position, such as a paint position, within the modular manufacturing station 700 while the work tool 730 is positioned at a first work tool position, as shown in FIG. 15. For example, the work tool 730 may be positioned on a first opposing side 750 of the article pathway volume 726 at the first work tool position, while the suspended article 710 is positioned at least partially within the work tool pathway volume 746. According to a specific example, a position tracking device 752, similar to those described above, may be configured to transmit a position signal 754 to the control system 718 indicative of a detection of the operational position of the suspended article 710. The control system 718 may be configured to activate the work tool 730 in response to the detection of the operational position. This may be accomplished via wired or wireless communication directly or indirectly between the control system 718 and the work tool 730. As described above, the work tool spray nozzle 732 may be moved according to a work tool program corresponding to identification information communicated by the carrier 724. In particular, the work tool 730 may complete surface processing of approximately one side or one half of the suspended article 710 responsive to control signals 755 from the control system 718.

Figure 16:
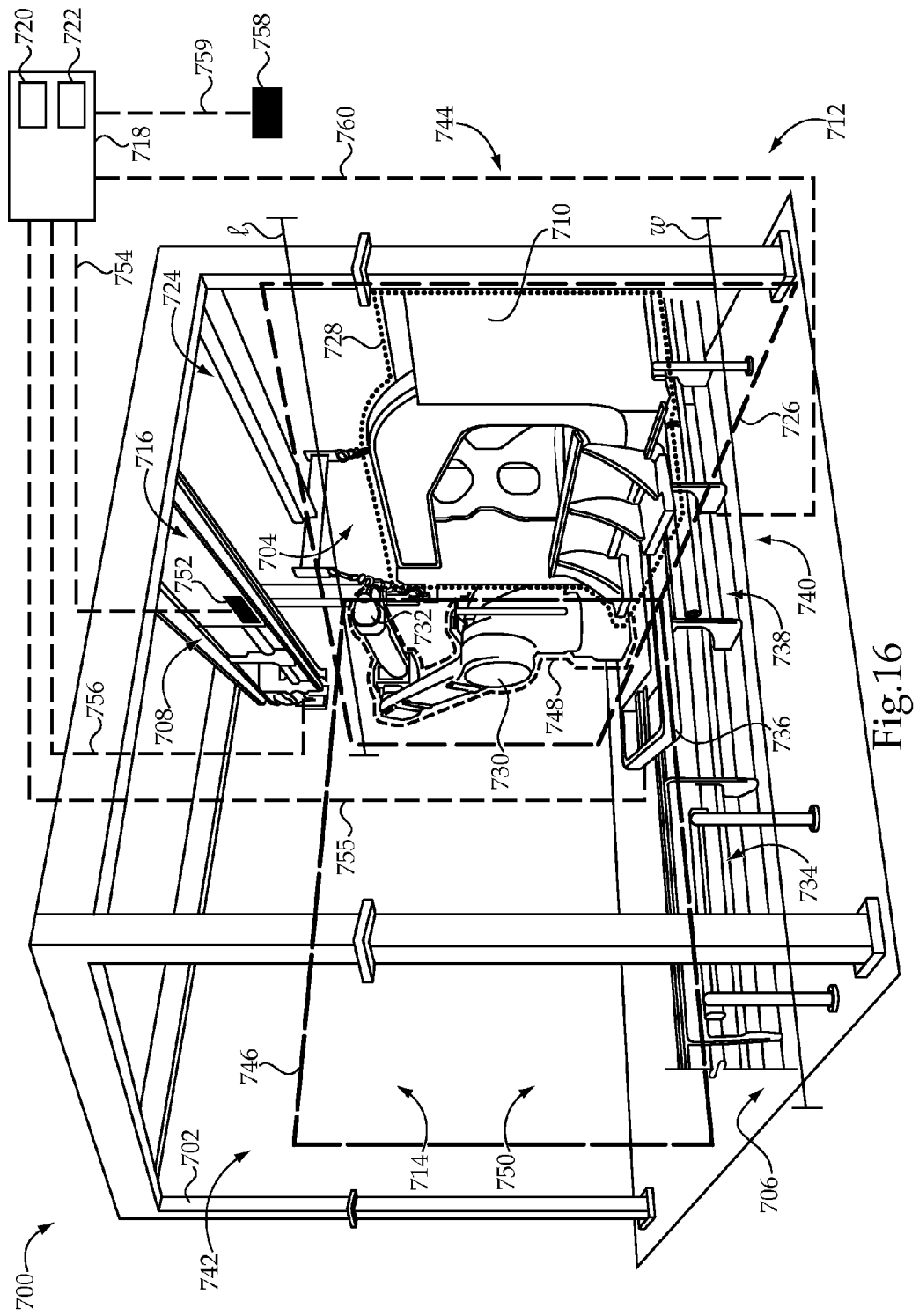
FIG. 16 is a perspective view of the modular manufacturing station of FIG. 15, depicting the suspended article at a work tool transfer position and depicting a transfer of the work tool from the first work tool position to a second work tool position.

After the work tool program, or a first portion thereof, is completed, the suspended article 710 may be moved from the operational position of FIG. 15 to a work tool transfer position, as shown in FIG. 16. In particular, the suspended article 710 may be moved in a forward transport direction or a reverse transport direction along the transportation path 716, such that the suspended article 710 is outside the work tool pathway volume 746. Depending on the length l of the modular manufacturing station, the suspended article 710 may be moved to a work tool transfer position within the modular manufacturing station 700 or within an adjacent modular manufacturing station. Such movement may be effected by transmitting control signals 756 from the control system 718 to the overhead friction drive system 708, as described herein.

After the suspended article 710 is moved outside of the work tool pathway volume 746, the work tool 730 may be transferred from the first work tool position of FIG. 15 toward a second work tool position, as shown in FIG. 16. For example, a position tracking device 758 may be configured to transmit a position signal 759 to the control system 718 indicative of a detection of the work tool transfer position of the suspended article 710. The control system 718 may then be configured to transfer the work tool 730 responsive to the detection of the work tool transfer position. As should be appreciated, the control system 718 may communicate with and transfer control signals 760 to the friction drive system 740 to control movement of the work tool 730.

Figure 17:
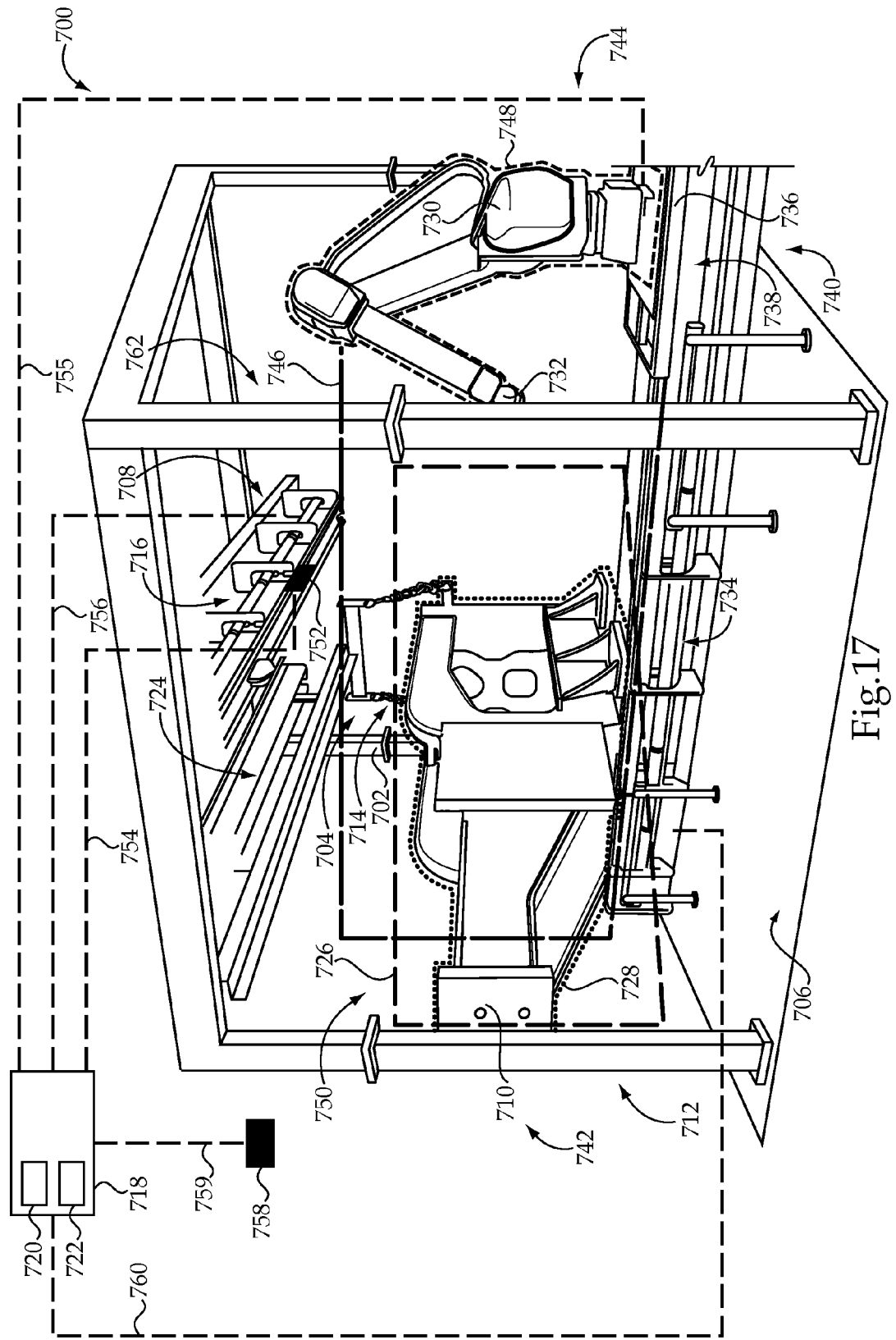
FIG. 17 is a perspective view of the modular manufacturing station of FIGS. 15 and 16, depicting the work tool at the second work tool position and the suspended article at the operational position.

As shown in FIG. 17, the work tool 730, after passing through the article pathway volume 726, may be transferred to the second work tool position on a second opposing side 762 of the article pathway volume 726. After the work tool 730 is appropriately positioned, the suspended article 710 may be returned to the operational position, which is at least partially within the work tool pathway volume 746. After the operational position is again detected, such as by using the position tracking device 752, the work tool may be again activated to complete processing of the suspended article 710. For example, the work tool 730 may treat or process the surface of the remaining side or half of the suspended article 710 to complete the surface processing operation at modular manufacturing station 700.

Figure 18:
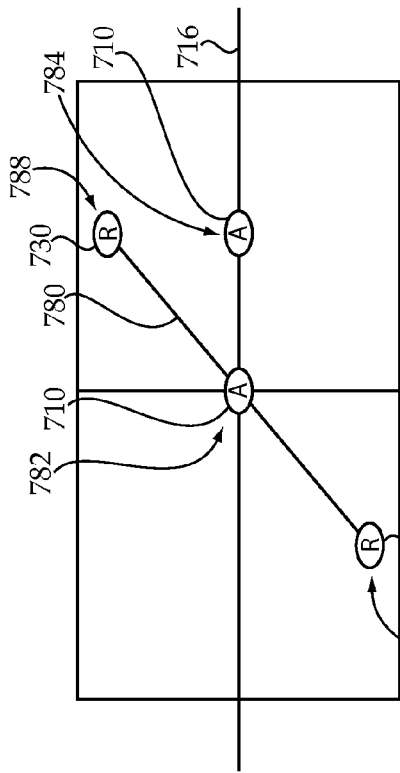
FIG. 18 is a diagrammatic plan view of a first exemplary floor mounted work tool support track relative to a transportation path.
Figure 19:
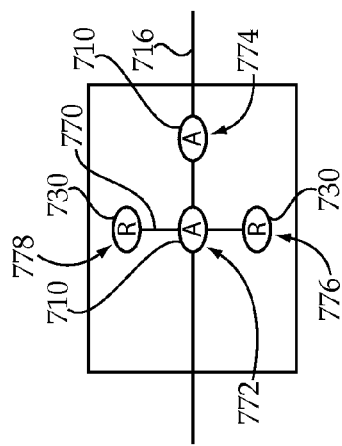
FIG. 19 is a diagrammatic plan view of a second exemplary floor mounted work tool support track relative to the transportation path.

Turning now to FIG. 18, exemplary embodiments of the floor mounted work tool support track 734 are shown. For example, a floor mounted work tool support track 770 may be substantially linear and may be perpendicular to the transportation path 716. The suspended article 710 is movable at least between an operational position 772 and a work tool transfer position 774. The work tool 730 may be laterally shifted between a first work tool position 776 and a second work tool position 778. Alternatively, as shown in FIG. 19, a floor mounted work tool support track 780 may be oriented at an angle between 0 degrees and 90 degrees relative to the transportation path 716. Similarly, the suspended article 710 may be movable between an operational position 782 and a work tool transfer position 784, while the work tool 730 may be angularly shifted through the manufacturing space 704 between a first work tool position 786 and a second work tool position 788.

Figure 20:
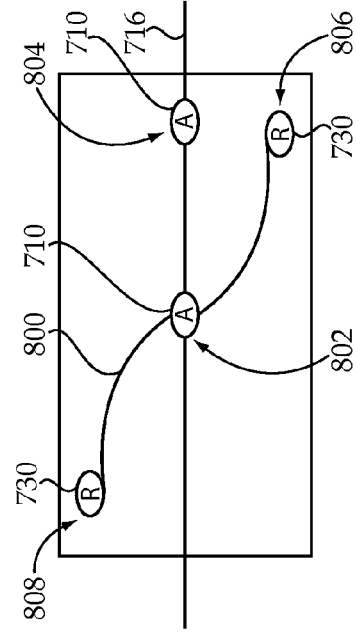
FIG. 20 is a diagrammatic plan view of a third exemplary floor mounted work tool support track relative to the transportation path.
Figure 21:
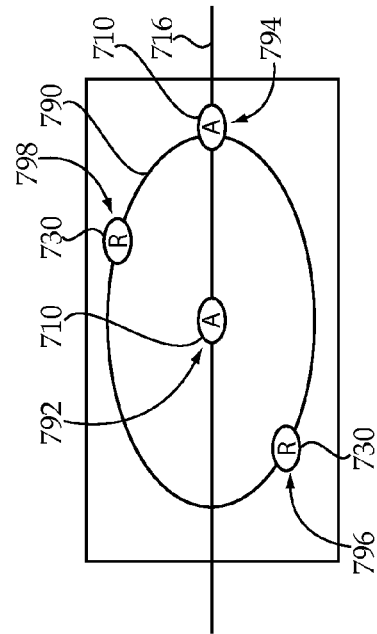
FIG. 21 is a diagrammatic plan view of a fourth exemplary floor mounted work tool support track relative to the transportation path.

According to alternative embodiments, the work tool 730 may be moved along a curved path. For example, as shown in FIG. 20, a floor mounted work tool support track 790 may be oval-shaped or circular. The suspended article 710 may be movable between an operational position 792 and a work tool transfer position 794, while the work tool 730 may be shifted along an oval-shaped path between a first work tool position 796 and a second work tool position 798. As an alternative to a continuous curved track, however, a discontinuous curved track may be provided. For example, a floor mounted work tool support track 800 may be angled relative to the transportation path 716 and may also be non-linear. The suspended article 710 may be movable between an operational position 802 and a work tool transfer position 804, while the work tool 730 may be shifted along a non-linear angled path between a first work tool position 806 and a second work tool position 808.

Utilizing the modular aspects and independent station control of the disclosed manufacturing chain 10 permits the incorporation of a floor mounted work tool support track 734 along which a work tool 730, such as a robotic arm may travel. Importantly, the strategy provided herein permits the use of exactly one work tool 730 that may be easily and efficiently shifted through the modular manufacturing station 700 from a convenient, easily accessed floor mounted position. Conventionally, multiple work tools or robotic arms are utilized to access all areas of the article 700. However, by utilizing a control strategy to advance or, alternatively, reverse a suspended article 710 along the transportation path 716 so that the work tool 730 may pass through the travel space at least partially occupied by the article 710, and return the work tool 730 to a previous operational position, a more cost effective solution is provided.

INDUSTRIAL APPLICABILITY

The manufacturing chain 10 of the present disclosure may provide a portable and flexible manufacturing chain that supports an improved manufacturing process. Specifically, the manufacturing chain 10 includes manufacturing modules 32 that may be relatively quickly and easily transported and deployed. In addition, modular manufacturing stations 18, 20, 22, 24, 26, and 28 may be readily added to and/or removed from the modules 32 of the manufacturing chain 10. Further, the article transportation system 30, and method of operation thereof, may allow independent process control at each modular manufacturing station 18, 20, 22, 24, 26, and 28 and, therefore, may provide improved efficiency with respect to the manufacturing process. Although a paint process is described, it should be appreciated that the manufacturing chain 10, as described herein, may be used to perform any of a variety of manufacturing processes.

Referring generally to FIGS. 1-14, the manufacturing chain 10, such as, for example, a paint line, may be deployed by erecting a plurality of manufacturing modules 32, as needed. Specifically, a plurality of support beams 82, 84, 86, 88, 98, 100, 102, and 104 may be secured to the planar floor 16 of a manufacturing area 12 and may be interconnected to provide a framework or skeleton 80. One or more of the support beams support beams 82, 84, 86, 88, 98, 100, 102, and 104 may be capable of expansion and/or contraction to further ease the transport and/or deployment of each manufacturing module 32. The skeleton 80 may provide structural support for one or more modular manufacturing stations, such as, for example, the first modular manufacturing station 118 and the second modular manufacturing station 160 and/or the modular manufacturing stations 18, 20, 22, 24, 26, and 28. Further, the skeleton may include pre-constructed utilities, namely a utility transfer module 40, supported by one or more of the support beams 82, 84, 86, 88, 98, 100, 102, and 104.

Each modular manufacturing station, such as stations 118 and 160, may include at least one piece of manufacturing equipment 120, an article transportation device 122 representing a portion of the article transportation system 30 corresponding to the respective station, and a station control system 124. It should be appreciated that the manufacturing equipment 120 may be positioned above the planar floor 16 and may be portable to facilitate movement of the equipment 120 from one location, such as a storage location, and into an operable position relative to the station. The manufacturing equipment 120, as well as the article transportation device 122, the station control system 124, and various other systems and/or components of each station 118 and 160 may receive one or more utilities from the utility transfer module 40.

It should be appreciated that modifying the manufacturing chain 10, such as adding or removing a modular manufacturing station may also be accomplished with relative ease. Specifically, a modular manufacturing station, similar to manufacturing stations 116 and 180, may be added to the manufacturing chain 10 by interconnecting a plurality of beams 82, 84, 86, 88, 98, 100, 102, and 104 to form a skeleton 80. The skeleton 80 may be connected to or, alternatively, positioned adjacent a contiguous manufacturing module 32. A utility transfer module 40, which may be supported by one of the beams 82, 84, 86, 88, 98, 100, 102, and 104, may be connected to a utility transfer module 40 of the contiguous manufacturing module 32 to provide utilities to the added manufacturing station.

One or more of an article transportation device 122, a piece of manufacturing equipment 120, and a station control system 124 may be supported by the skeleton 80, or otherwise positioned within an operable distance of the added manufacturing station. In addition, one or more of the article transportation device 122, the manufacturing equipment 120, and the station control system 124 may be connected to the utility transfer module 40 to receive one or more utilities therefrom, such as using quick connect coupling members, as described above.

Operation of the manufacturing chain 10 may be controlled and/or coordinated using the control system 220. Specifically, one or more of the main control system 230 and the station control systems 124 may be configured to advance at least one carrier 164 from a beginning of the manufacturing chain 10 to an end of the manufacturing chain 10, such as in the forward transport direction "F." This advancement, according to a specific example, may include independently moving a carrier 164 of the first modular manufacturing station 118 according to a first unique operation pattern and a carrier 164 of the second modular manufacturing station 160 according to a second unique operation pattern. According to one embodiment, the first unique operation pattern may include the forward transport direction "F" and the reverse transport direction "R." The second unique operation pattern may, for example, include moving the carrier 164 in the vertical direction relative to the transportation path 166, such as by raising and/or lowering the carrier 164.

The memory 234 of the main control system 230 may store the first and second unique operation patterns for controlling operation of the first and second modular manufacturing stations 118 and 160, respectively, thereon. The first position tracking devices 176 of each modular manufacturing station 118 and 160 may detect a first position of each carrier 164 as it is transported through the respective one of the manufacturing stations 118 and 160, and transmit first position signals to the main control system 230. It should be appreciated that any of the operation signals, including position signals, may be transmitted through the station control systems 124.

The processor 232 of the main control system 230 may be configured to independently transmit an operation signal corresponding to each of the first and second unique operation patterns to the respective one of the manufacturing stations 118 and 160 based, at least in part, on the detected first positions. For example, the processor 232 may independently transmit one or more operation signals, such as, for example, the forward signal, to each article transportation device 122 upon detecting that each carrier 164 is entering the respective one of the modular manufacturing stations 118 and 160. Similarly, the processor 232 may be configured to independently transmit one or more operation signals to the manufacturing equipment 120 based, at least in part, on the detected first positions.

In addition, the second position tracking devices 178 and the third position tracking devices 180 of the manufacturing stations 118 and 160 may detect second and third positions, respectively, and transmit second and third position signals to the main control system 230, such as through the station control systems 124. The processor 232 may also be configured to independently transmit an operation signal corresponding to each of the first and second unique operation patterns to the respective one of the manufacturing stations 118 and 160 based, at least in part, on one of the detected second and third positions. Similarly, the processor 232 may be configured to independently transmit one or more operation signals to the manufacturing equipment 120 based, at least in part, on one of the detected second and third positions.

For example, the processor 232 may be configured to transmit the reverse signal to the article transportation device 122 of the first modular manufacturing station 118 upon detecting that the carrier 164 has reached a predetermined position relative to the manufacturing equipment 120. Similarly, the processor 232 may be configured to transmit the lower signal to the article transportation device 122, or second vertical lift device 212, of the second modular manufacturing station 160 upon detecting that the carrier 164 has reached a predetermined position relative to the manufacturing equipment 120. Determining that the carrier 164 has reached the predetermined position, in either example, may be based, at least in part, on one of the second and third position signals.

In addition, the processor 232 of the main control system 230 may be configured to index the carriers 164 of each modular manufacturing station 118 and 160 as each carrier 164 traverses to a contiguous manufacturing station. Indexing may, for example, include detecting one of the second and third positions, as described above, of each carrier 164 and simultaneously transferring each carrier 164 to a contiguous manufacturing station.

It should be appreciated that manufacturing chain 10, including a plurality of modular manufacturing stations 18, 20, 22, 24, 26, and 28, as described herein, may be deployed and/or modified with relative ease. Each modular manufacturing station 18, 20, 22, 24, 26, and 28, as further exemplified by first and second modular manufacturing stations 118 and 160, is characterized as having a separate article transportation device 122 that allows each carrier 164 to move independently through the respective station. The control system 220 coordinates the independent movements occurring at each station 18, 20, 22, 24, 26, and 28 and synchronizes the transfer of each carrier 164 to a contiguous one of the modular manufacturing stations to define one overlying process flow for the manufacturing chain 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A modular manufacturing line, comprising:
a first modular manufacturing station including a first framework defining a first manufacturing space, and a first overhead friction drive system supported on the first framework and configured to move a first suspended article through the first manufacturing space;
a second modular manufacturing station including a second framework defining a second manufacturing space, and a second overhead friction drive system supported on the second framework and configured to move a second suspended article through the second manufacturing space;
wherein the first and second overhead friction drive systems are operationally aligned to define a transportation path through the modular manufacturing line;
a control system in control communication with the first and second overhead friction drive systems and configured to simultaneously control the first suspended article according to a first operation pattern and control the second suspended article according to a second operation pattern that is different than the first operation pattern; and
a work tool including a work tool spray nozzle operationally positioned at the first modular manufacturing station and movable along a floor mounted work tool support track;
wherein the first suspended article occupies an article pathway volume during movement through the first manufacturing space, wherein the article pathway volume corresponds to an article footprint and a length of the first modular manufacturing station;
wherein the work tool occupies a work tool pathway volume during movement through the first manufacturing space, wherein the work tool pathway volume corresponds to a work tool footprint and a width of the first modular manufacturing station;
wherein the article pathway volume and the work tool pathway volume intersect.

2. The modular manufacturing line of claim 1, wherein the work tool is movable between a first work tool position on a first opposing side of the article pathway volume and a second work tool position on a second opposing side of the article pathway volume.

3. The modular manufacturing line of claim 2, wherein the control system is configured to move the first suspended article between an operational position at least partially within the work tool pathway volume and a work tool transfer position outside of the work tool pathway volume.

4. The modular manufacturing line of claim 3, further including a position tracking device configured to transmit a position signal to the control system indicative of a detection of the operational position, wherein the control system is configured to activate the work tool responsive to the detection of the operational position.

5. The modular manufacturing line of claim 3, further including a position tracking device configured to transmit a position signal to the control system indicative of a detection of the work tool transfer position, wherein the control system is configured to transfer the work tool from the first work tool position to the second work tool position responsive to the detection of the work tool transfer position.

6. The modular manufacturing line of claim 2, further including a carrier supporting the first suspended article and including identification information corresponding to the first suspended article, wherein the carrier communicates the identification information to the work tool.

7. The modular manufacturing line of claim 1, wherein the floor mounted work tool support track is linear and is perpendicular to the transportation path.

8. The modular manufacturing line of claim 1, wherein the floor mounted work tool support track is linear and is oriented at an angle between 0 degrees and 90 degrees relative to the transportation path.

9. The modular manufacturing line of claim 1, wherein the floor mounted work tool support track is curved.

10. The modular manufacturing line of claim 1, wherein the modular manufacturing line includes exactly one work tool including the work tool spray nozzle.

11. A method of operating a modular manufacturing line, wherein the modular manufacturing line includes: a first modular manufacturing station including a first framework defining a first manufacturing space and supporting a first overhead friction drive system; a second modular manufacturing station including a second framework defining a second manufacturing space and supporting a second overhead friction drive system; wherein the first and second overhead friction drive systems are operationally aligned to define a transportation path through the modular manufacturing line; a control system in control communication with the first and second overhead friction drive systems; and a work tool including a work tool spray nozzle operationally positioned at the first modular manufacturing station, the method comprising steps of:

supporting a first suspended article from the first overhead friction drive system;

supporting a second suspended article from the second overhead friction drive system;

transmitting first control signals from the control system to the first overhead friction drive system and transmitting second control signals from the control system to the second overhead friction drive system;

simultaneously moving the first suspended article within the first manufacturing space according to a first operation pattern responsive to the first control signals and moving the second suspended article within the second manufacturing space according to a second operation pattern that is different than the first operation pattern responsive to the second control signals;

occupying an article pathway volume with the first suspended article during the step of moving the first suspended article, wherein the article pathway volume corresponds to an article footprint and a length of the first modular manufacturing station; and moving the work tool along a floor mounted work tool support track and through the article pathway volume.

12. The method of claim 11, further including occupying a work tool pathway volume with the work tool during movement through the first manufacturing space, wherein the work tool pathway volume corresponds to a work tool footprint and a width of the first modular manufacturing station.

13. The method of claim 12, further including:

moving the first suspended article to an operational position at least partially within the work tool pathway volume while the work tool is at a first work tool position on a first opposing side of the article pathway volume; and activating the work tool while the work tool is at the first work tool position and the first suspended article is at the operational position.

14. The method of claim 13, further including:

transmitting a position signal indicative of a detection of the operational position from a position tracking device to the control system; and activating the work tool responsive to the detection of the operational position.

15. The method of claim 13, further including:

supporting the first suspended article with a carrier;

communicating identification information corresponding to the first suspended article from the carrier to the work tool; and moving the work tool spray nozzle according to a work tool program corresponding to the identification information.

16. The method of claim 13, further including:

moving the first suspended article from the operational position to a work tool transfer position outside of the work tool pathway volume; and transferring the work tool from the first work tool position to a second work tool position on a second opposing side of the article pathway volume while the first suspended article is in the work tool transfer position.

17. The method of claim 16, further including:

transmitting a position signal indicative of a detection of the work tool transfer position from a position tracking device to the control system; and transferring the work tool responsive to the detection of the work tool transfer position.

18. The method of claim 16, further including:

returning the first suspended article to the operational position while the work tool is at the second work tool position; and activating the work tool while the work tool is at the second work tool position and the first suspended article is at the operational position.

19. The method of claim 11, wherein moving the work tool includes moving the work tool along a linear path that is perpendicular to the transportation path.

20. The method of claim 11, wherein moving the work tool includes moving the work tool along a curved path.

* * * * *